(12) United States Patent
Suzuki et al.

(10) Patent No.: US 7,428,341 B2
(45) Date of Patent: Sep. 23, 2008

(54) METHOD AND APPARATUS FOR LOSSLESS DATA TRANSFORMATION WITH PREPROCESSING BY ADAPTIVE COMPRESSION, MULTIDIMENSIONAL PREDICTION, MULTI-SYMBOL DECODING ENHANCEMENT ENHANCEMENTS

(75) Inventors: Norihisa Suzuki, Los Altos Hills, CA (US); Todd Williamson, Brookline, MA (US)

(73) Assignee: Zaxel Systems, Inc., Los Altos, CA (US)

( * ) Notice: Subject to any disclaimer, the term of this patent is extended or adjusted under 35 U.S.C. 154(b) by 317 days.

(21) Appl. No.: 11/090,807

(22) Filed: Mar. 24, 2005

(65) Prior Publication Data

US 2005/0226518 A1    Oct. 13, 2005

Related U.S. Application Data

(63) Continuation-in-part of application No. 10/446,506, filed on May 27, 2003, now Pat. No. 6,882,750.

(51) Int. Cl.
    *G06K 9/36* (2006.01)
(52) U.S. Cl. .......................... 382/246; 382/239
(58) Field of Classification Search ................ 382/232, 382/238–239, 244–247, 168, 166; 341/65; 358/426.13; 375/240.12, 240.24, 240.27
    See application file for complete search history.

(56) References Cited

U.S. PATENT DOCUMENTS

| 4,816,914 | A | | 3/1989 | Ericsson |
| 4,868,653 | A | | 9/1989 | Golin et al. |
| 5,057,917 | A | | 10/1991 | Shalkauser et al. |
| 5,095,374 | A | | 3/1992 | Klein et al. |
| 5,287,200 | A | | 2/1994 | Sullivan et al. |
| 5,491,564 | A | * | 2/1996 | Hongu .................... 382/238 |
| 5,710,909 | A | | 1/1998 | Brown et al. |
| 5,751,860 | A | * | 5/1998 | Su et al. .................. 382/244 |
| 5,764,374 | A | * | 6/1998 | Seroussi et al. ........... 382/244 |
| 5,835,034 | A | | 11/1998 | Seroussi et al. |
| 5,852,682 | A | | 12/1998 | Kim |
| 5,883,976 | A | | 3/1999 | Ohsawa |
| 5,945,933 | A | | 8/1999 | Kalkstein |
| 6,008,847 | A | | 12/1999 | Bauchspies |
| 6,009,209 | A | | 12/1999 | Acker et al. |
| 6,016,163 | A | | 1/2000 | Rodriguez et al. |
| 6,041,078 | A | | 3/2000 | Rao |
| 6,075,470 | A | | 6/2000 | Little et al. |

(Continued)

FOREIGN PATENT DOCUMENTS

EP    0 720 379    7/1996

(Continued)

OTHER PUBLICATIONS

Osako et al., *A Dynamic Computation Resource Scalable Algorithm for Software Video Codec*, ISSN 0340-5095; Sep. 1997.

(Continued)

*Primary Examiner*—Daniel G Mariam
(74) *Attorney, Agent, or Firm*—Michael A. Glenn; Glenn Patent Group

(57) ABSTRACT

A process for improved, lossless data transformation with options for adaptive compression, multidimensional prediction, multi-symbol decoding.

9 Claims, 17 Drawing Sheets

U.S. PATENT DOCUMENTS

| | | | |
|---|---|---|---|
| 6,081,209 | A | 6/2000 | Schuyler et al. |
| 6,297,754 | B1 | 10/2001 | Miyasaka et al. |
| 6,785,425 | B1 | 8/2004 | Feder et al. |
| 7,200,275 | B2 | 4/2007 | Srinivasan et al. |
| 2005/0053137 | A1 | 3/2005 | Holcomb |
| 2006/0262979 | A1 | 11/2006 | Srinivasan et al. |

FOREIGN PATENT DOCUMENTS

| | | |
|---|---|---|
| EP | 0 743 794 | 11/1996 |
| WO | WO 01/84447 | 11/2001 |

OTHER PUBLICATIONS

Abrahams, *Code and Parse Trees for Lossless Source Coding*, IEEE 1998.

Huang et al., *Windowed Huffman Coding Algorithm with Size Adaptation*, IEEE 1993.

Wang, et al., *Best-Neighborhood Matching: and Information loss Restoration Technique for Block based Image Coding Systems*, IEEE 1998.

Liu, et al., *Desgin and Hardware Architectures for Dynamic Huffman Coding*, IEEE 1995.

* cited by examiner

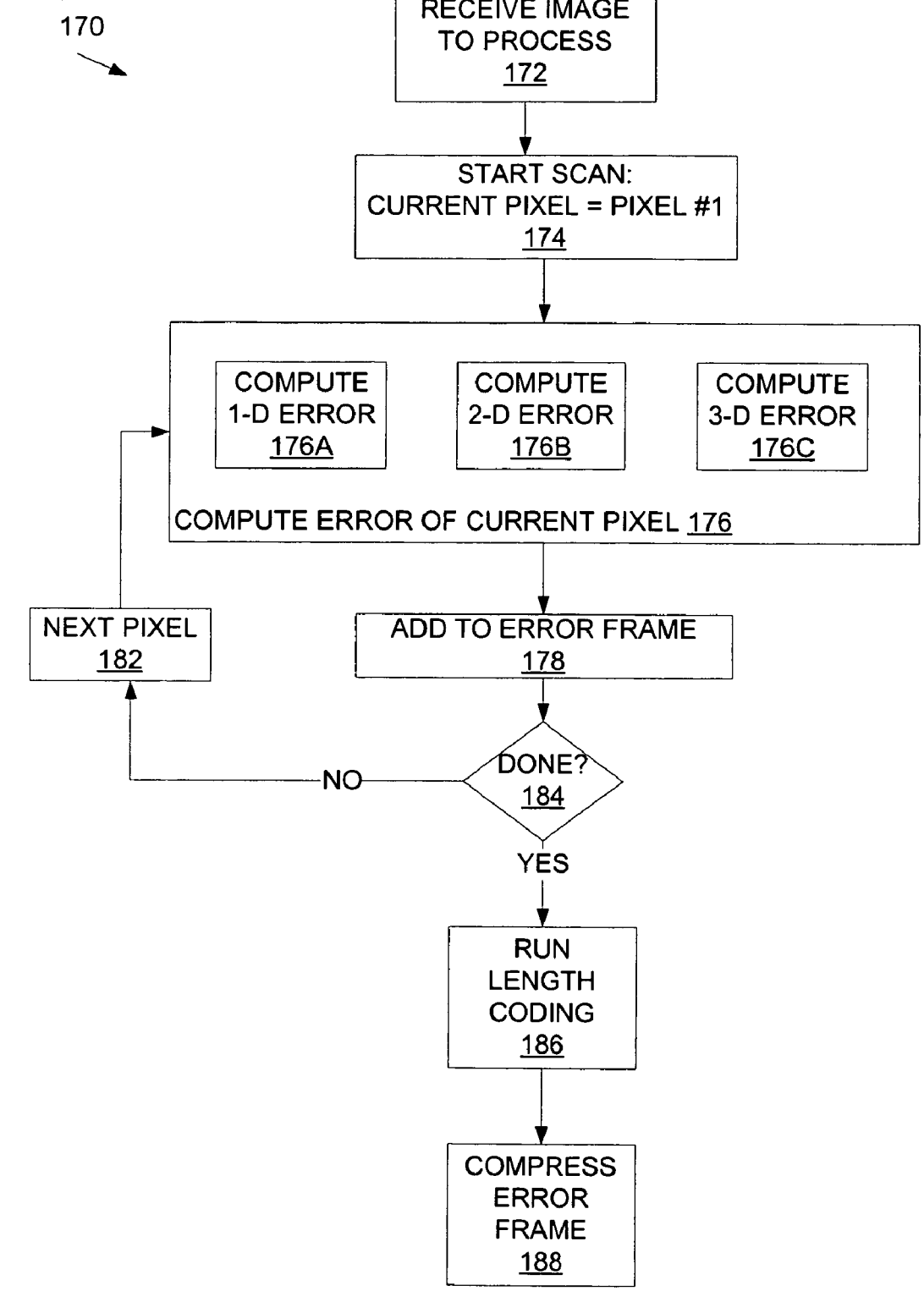

190

|  |  | LUU | UU |  |
|---|---|---|---|---|
|  | LLU | LU | U | RU |
|  | LL | L | S |  |

192

|  |  | $LUU_0$ | $UU_0$ |  |
|---|---|---|---|---|
|  | $LLU_0$ | $LU_0$ | $U_0$ | $RU_0$ |
|  | $LL_0$ | $L_0$ | $S_0$ |  |

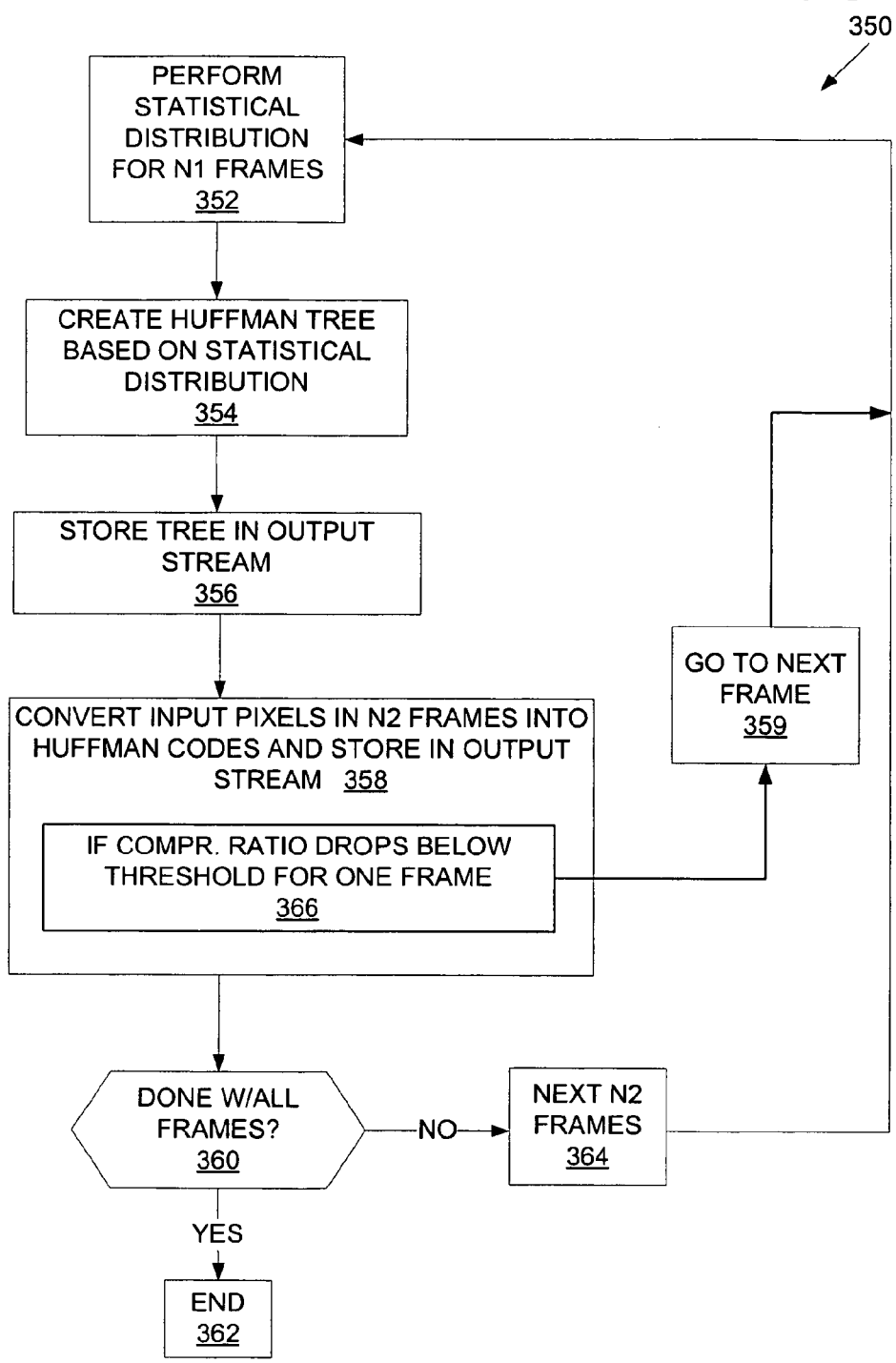

FIG. 6B

| MULTI-SYMBOL DECODING TABLE 670 | | | |
|---|---|---|---|
| INDEX<br><br>671 | NUMBER OF BITS ("numBits")<br><br>672 | NUMBER OF CODES ("numCodes")<br><br>674 | DECODED VALUES ("codeArray")<br><br>676 |
| 00000000000 | 10 | 5 | \| a \| a \| a \| a \| a \| |
| . . . | . . . | . . . | . . . |
| . . . | . . . | . . . | . . . |
| 00011101100 | 9 | 3 | \| a \| b \| x \| |
| . . . | . . . | . . . | . . . |
| 00000000101 | 9 | 3 | . . . |
| . . . | . . . | . . . | . . . |
| 01010101010 | 12 | N/A | N/A |
| . . . | . . . | . . . | . . . |
| 11011001001 | 11 | 3 | \| x \| a \| r \| |
| . . . | . . . | . . . | . . . |

< -INDEX - >
WIDTH
678

<----------------------- TABLE WIDTH 678 ----------------------->

1100

METHOD AND APPARATUS FOR LOSSLESS DATA TRANSFORMATION WITH PREPROCESSING BY ADAPTIVE COMPRESSION, MULTIDIMENSIONAL PREDICTION, MULTI-SYMBOL DECODING ENHANCEMENT ENHANCEMENTS

CROSS REFERENCE TO RELATED APPLICATIONS

This application is a Continuation-in-Part of co-pending U.S. patent application Ser. No. 10/446,506, entitled Fast Loss Less Image Compression System Based on Neighborhood Comparisons, filed on May 27, 2003 (now issued as U.S. Pat. No. 6,882,750) in the name of Norihisa Suzuki. The entirety of the foregoing application is hereby incorporated herein by reference.

BACKGROUND OF THE INVENTION

1. Technical Field

This invention relates to lossless data transformation, such as compression and decompression. More particularly, the invention concerns lossless transformation utilizing adaptive compression, multidimensional prediction, and/or multi-symbol decoding.

2. Description of the Prior Art

Video data is typically encoded in large blocks of memory. Even a single video frame can require megabytes to describe it. Video data requires large amounts of memory to store and high communication bandwidths to transfer. It therefore is highly advantageous to compress video data. However, some compression methods lose information in the process.

Some applications can tolerate various degrees of loss, but still others require loss-less compression.

The typical loss-less video data compression methods use differential pulse code modulation (DPCM). A current pixel value is replaced by the difference between it and the previous pixel. Since pixel values change rather slowly along scan lines, the difference values will near zero, making compression algorithms particularly effective. However, many times, the slow change between pixel values occurs in vertical or diagonal bands. Techniques that can only take advantage of horizontal bands in the image are compromised.

Huffman coding can be used to compress real-time video data. A Huffman-tree is built and the tree is used to recode the data. The basic idea is that frequently occurring video codes are replaced by a Huffman code that requires fewer bits. Occasional video codes that occur infrequently are described with Huffman codes that require more bits than the video code itself. In spite of this, the mere use of Huffman codes does result in an overall gain in compression.

In spite of the advantages provided by Huffman coding and other advancements in the field of data compression, the present inventor(s) has worked to develop enhancements, improvements, and solutions to various problems in the related field.

SUMMARY

Broadly, one aspect of the present disclosure is a process for improved, lossless data transformation with options for adaptive compression, multidimensional prediction, and/or multi-symbol decoding.

BRIEF DESCRIPTION OF THE DRAWINGS

FIG. 1B is a flowchart showing an exemplary sequence for multidimensional prediction.

FIG. 3A is a flowchart of a generalized compression sequence.

FIG. 6B is an example of a multi-symbol decoding table prepared according to FIG. 6A.

DETAILED DESCRIPTION

Hardware

Structure

Figure 1:
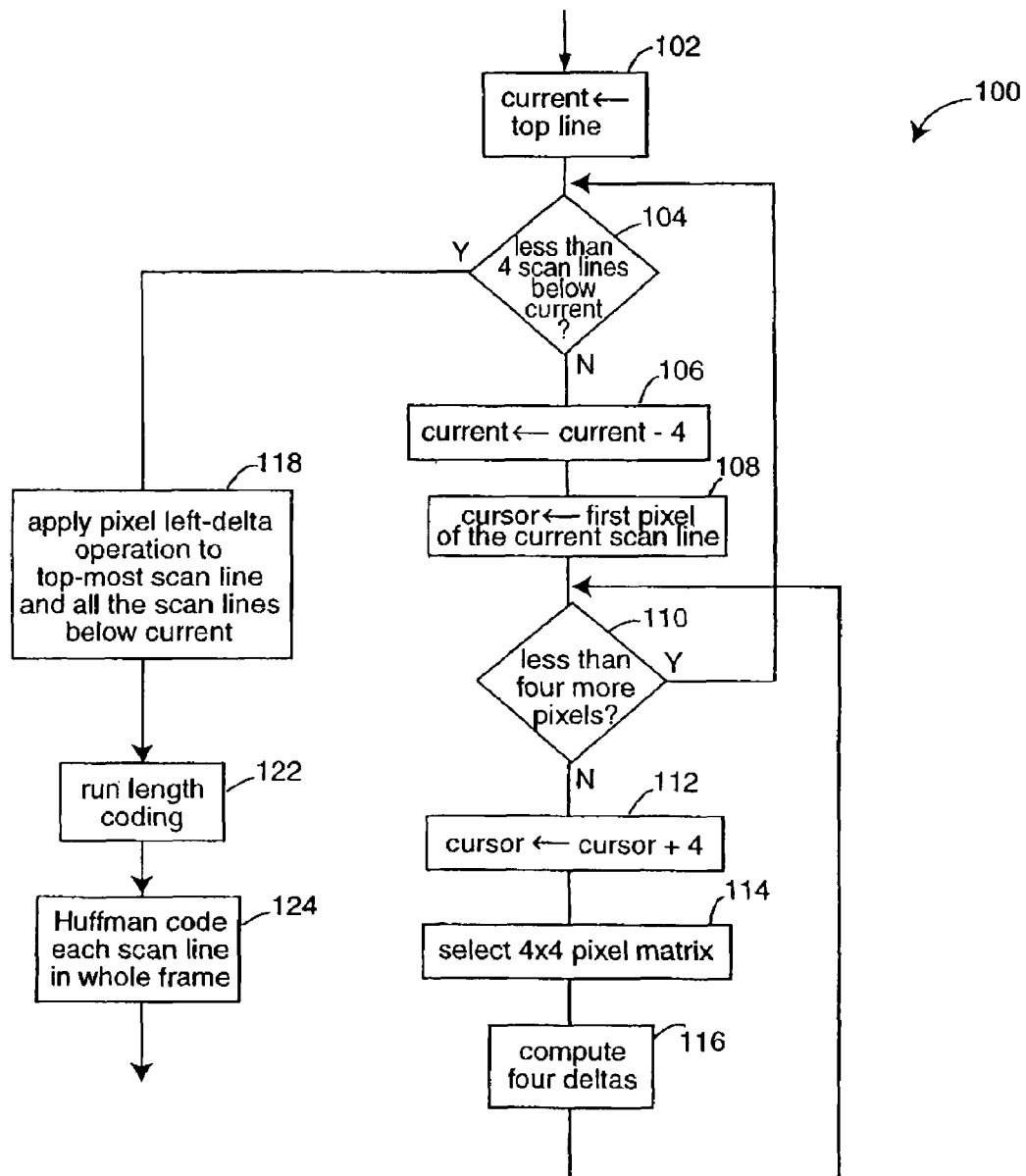
FIG. 1 is a flowchart of a video data compression sequence that uses four delta computations.

One aspect of the present disclosure concerns a data transformation apparatus, which may be embodied by various hardware components and interconnections. To provide some examples, the data transformation apparatus may be implemented as a application specific integrated circuit (ASIC), video card, rack-mounted electronic module, external processing module, computer program, subroutine, firmware, logic circuit, or a variety of other forms. The data transformation apparatus may further include various subcomponents, each of which may be implemented by one or more hardware devices, software devices, a portion of one or more hardware or software devices, or a combination of the foregoing. The makeup of the foregoing hardware features is described in greater detail below, with reference to an exemplary digital data processing apparatus, logic circuit, and signal bearing medium.

Exemplary Digital Data Processing Apparatus

As one example, the data transformation apparatus may be implemented in by a data processing entity, which itself may be produced in various forms. One example is a digital data processing apparatus, as exemplified by the hardware components and interconnections of the digital data processing apparatus 900 of FIG. 9.

The apparatus 900 includes a processor 902, such as a microprocessor, personal computer, workstation, controller, microcontroller, state machine, or other processing machine, coupled to storage 904. In the present example, the storage 904 includes a fast-access storage 906, as well as nonvolatile storage 908. The fast-access storage 906 may comprise random access memory ("RAM"), and may be used to store the programming instructions executed by the processor 902. The nonvolatile storage 908 may comprise, for example, battery backup RAM, EEPROM, flash PROM, one or more magnetic data storage disks such as a "hard drive", a tape drive, or any other suitable storage device. The apparatus 900 also includes an input/output 910, such as a line, bus, cable, electromagnetic link, channel, interface, or other means for the processor 902 to exchange data with other hardware external to the apparatus 900.

Despite the specific foregoing description, ordinarily skilled artisans (having the benefit of this disclosure) will recognize that the apparatus discussed above may be implemented in a machine of different construction, without departing from the scope of the invention. As a specific example, one of the components 906, 908 may be eliminated; furthermore, the storage 904, 906, and/or 908 may be provided on-board the processor 902, or even provided externally to the apparatus 900.

Signal-Bearing Media

Figure 9:
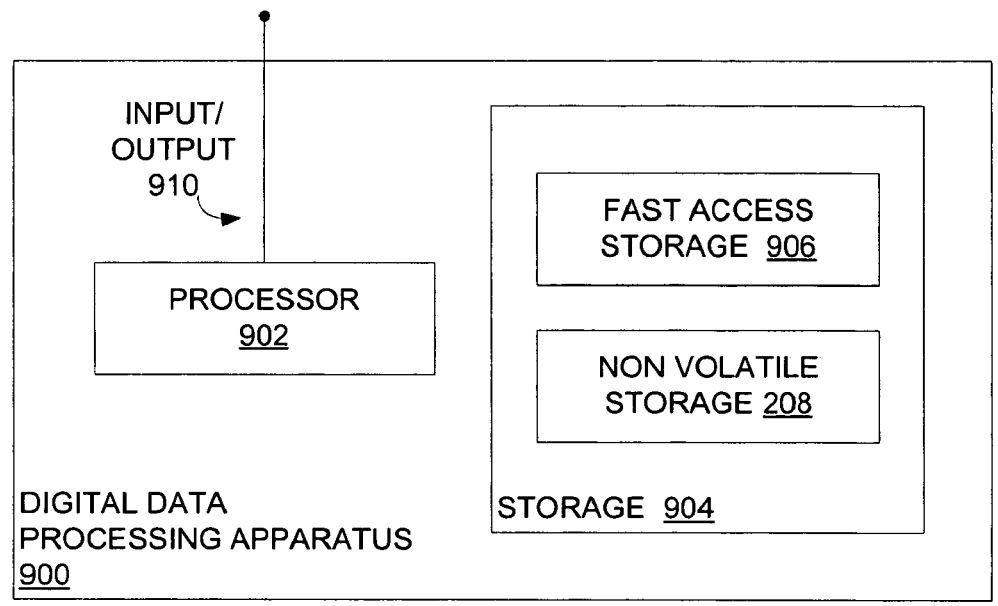
FIG. 9 is a block diagram of an exemplary digital data processing machine.
Figure 10:
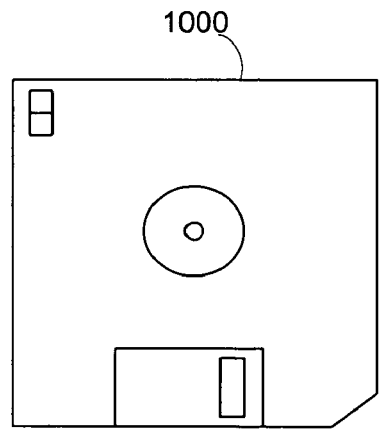
FIG. 10 is a plan view of an exemplary signal-bearing medium.

Wherever any functionality of the present disclosure is implemented using one or more machine-executed program sequences, such sequences may be embodied in various forms of signal-bearing media. In the context of FIG. 9, such a signal-bearing media may comprise, for example, the storage 904 or another signal-bearing media, such as a removable data storage media 1000 (FIG. 10), directly or indirectly accessible by a processor 902. Whether contained in the storage 906, media 1000, or elsewhere, the instructions may be stored on a variety of machine-readable data storage media. Some examples include direct access storage (e.g., a conventional "hard drive", redundant array of inexpensive disks ("RAID"), or another direct access storage device ("DASD")), serial-access storage such as magnetic or optical tape, electronic non-volatile memory (e.g., ROM, EPROM, flash PROM, or EEPROM), battery backup RAM, optical storage (e.g., CD-ROM, WORM, DVD, digital optical tape), paper "punch" cards, or other suitable signal-bearing media including analog or digital transmission media and analog and communication links and wireless communications. In an illustrative embodiment, the machine-readable instructions may comprise software object code, compiled from a language such as assembly language, C, etc.

Logic Circuitry

In contrast to the signal bearing medium discussed above, a different embodiment uses logic circuitry instead of computer-executed instructions to implement some or all of the operational sequences described herein. Depending upon the particular requirements of the application in the areas of speed, expense, tooling costs, and the like, this logic may be implemented by constructing an application-specific integrated circuit (ASIC) having thousands of tiny integrated transistors. Such an ASIC may be implemented with CMOS, TTL, VLSI, or another suitable construction. Other alternatives include a digital signal processing chip (DSP), discrete circuitry (such as resistors, capacitors, diodes, inductors, and transistors), field programmable gate array (FPGA), programmable logic array (PLA), programmable logic device (PLD), and the like.

Figure 11:
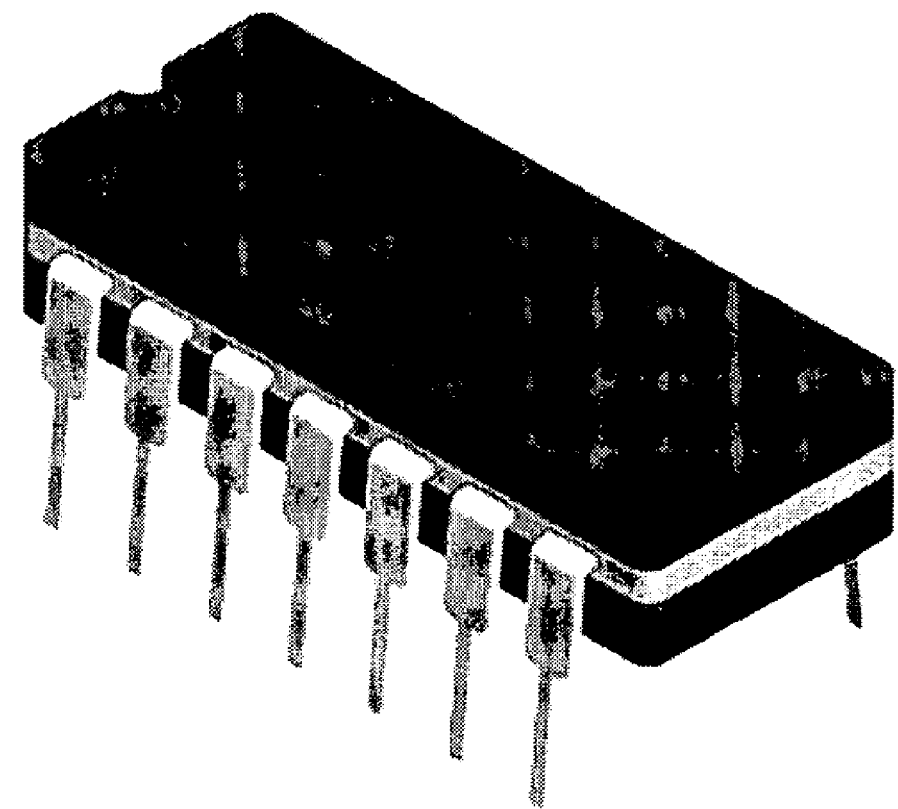
FIG. 11 is a perspective view of exemplary logic circuitry.

Without any intended limitation, FIG. 11 illustrates an exemplary package 1100 for logic circuitry. A nearly limitless variety of packages for logic circuit are the subject of commercial products, technical publications, knowledge in the relevant art, etc.

Operation

Introduction

Having described various structural features, some operational aspects of the present disclosure are now described. As mentioned above, some operational aspects of the present disclosure involve processes for lossless encoding and decoding of input symbols. Some further enhancements include techniques for adaptive compression, multidimensional prediction, and multi-symbol decoding.

The following description emphasizes a video compression application. With today's digital media explosion, video compression finds many applications including digital video cameras, x-ray machines, computer aided tomography, broadcast media, and many more. Nonetheless, the video compression application is provided without any intended limitation, as this disclosure is equally applicable to compress and decompress virtually any sequence of input symbols, including but not limited to audio signals, radio waves, radar signals, etc. In this respect, the use of terms such as "pixel" is intended to illustrate an exemplary embodiment of a broader utility that signal "members."

Method for Best Neighbor Pre-Processing & Huffman Coding

FIG. 1 represents a fast preprocessing best-neighbor compression method embodiment, and is referred to herein by the general reference numeral 100. One skilled in the art will readily appreciate that, although the text below use a block of size four by four as an example, this can be generalized to a block of n by m, for any number n which is smaller than the number of scan lines, and m which is smaller than the number of pixels in one scan line.

A typical video stream for compression by method 100 comprises a series of video frames, each video frame comprises a number of scan lines, and each scan line includes a number of pixels. The method 100 comprises a step 102 that sets a current-scan-line address counter to the top scan line of a frame. A step 104 checks if there are less than four (n) scan lines left below the current scan line. If not, a step 106 lowers the current-scan-line address counter by four (n). Here and in FIG. 1, for purposes of example, scan lines are numbered from bottom of the frame to the top. However, any beneficial and appropriate numbering scheme may be used in practice.

A step 108 sets a cursor address counter to the first, or left-most pixel of the current scan line. A step 110 checks to see if there are less than four (m) pixels to the right of the cursor. If so, control returns to step 104. Otherwise, a step 112 advances the cursor address counter to the right by four (m). A step 114 selects, for example, a four-by-four (n-by-m) pixel matrix with a cursor pixel at a bottom-right corner.

A step 116 computes four pixel-differential (delta) values for the selected pixel matrix, i.e., left delta, left-above delta, above delta, and right-above delta. An evaluation measure is computed for each delta matrix resulting from four delta operations. The delta matrix with the best (lowest) evaluation measure is selected. One marker is added to indicate which delta matrix was selected. The original matrix is replaced with the selected delta matrix and its marker. Huffman coding is applied to the marker.

A step 118 applies pixel left-delta computation to the remaining scan lines below current and top most scan line. Pixel left-delta computation replaces the pixel values of the entire scan line except the left most pixel. Each pixel is replaced by the difference between the value of that pixel and the original value of the immediately left neighbor pixel. A step 122 applies run-length coding. For example, if there is a sequential series of the same number in the pixel values such as: 0, 0, 0, 0, 1, 1, 1, 1, 2, 2, 2, 2. This will be coded as a series of tuples: (4,0), (4,1), (4,2), where the first integer indicates the number of times the second integer is duplicated. A step 124 then Huffman codes each pixel of the whole resultant frame. Optionally, run-length coding may be skipped in the event that it is not effective in certain images due to noise; in this event, run-length coding is applied to the markers for each region (which are expected to change slowly and have little noise).

In method embodiments of this disclosure, a left delta operation returns a four-by-four (n-by-m) matrix with pixel values computed from the original matrix. For each pixel in the original matrix, a difference is calculated between a current pixel value and a left neighbor pixel value.

A left-above delta operation returns a four-by-four (n-by-m) matrix with pixel values computed from the original matrix. For each pixel in an original matrix, a difference is calculated between a current pixel value and a diagonally left and above neighbor pixel value.

An above delta operation returns a four-by-four (n-by-m) matrix with pixel values computed from the original matrix. For each pixel in the original matrix, a difference is calculated between a current pixel value and an above-neighbor pixel value.

A right-above delta operation returns a four-by-four (n-by-m) matrix with pixel values computed from the original matrix. For each pixel in the original matrix, a difference is calculated between a current pixel value and the diagonally right and above neighbor pixel value.

The Huffman coding comprises Huffman code tree building and encoding based on the Huffman code tree. The Huffman code tree building takes a substantial amount of time. Compression techniques such as MPEG use Huffman coding, but they use one Huffman code tree for the entire video. This is not satisfactory in many cases since the compression ratio deteriorates.

The disclosed sequences create the Huffman code tree periodically. One approach creates the Huffman code tree once every fixed number of frames. The frequency of the tree generation is computed so that the computation time for tree generation per frame is about one tenth of the encoding time.

Another approach is an adaptive approach. If the computer is fast and a lot of cycles are left, then the Huffman code tree generation is run more frequently to get a better compression ratio. One approach to problem looks at the input buffer. Whenever the input buffer becomes empty or near empty, that means the compression system is catching up with the video input and, therefore, processing time is left over to do other things, such as tree generation. This algorithm looks at the input buffer size and if the size falls below a threshold, then the Huffman code tree generation is invoked.

Since the most expensive part of Huffman code tree generation is the collection of image statistics, one additional approach is to collect statistics while compressing each frame, and compute a new code tree for each new frame based on statistics from one or more previous frames. This has two advantages: (1) it saves computation time because it is faster to compute the statistics while compressing or decompressing the data, and (2) it is unnecessary to store the Huffman code tree in the compressed stream because both the compression and decompression code have access to the same data from which to compute the code tree. The primary disadvantage of this method is that when the video stream statistics change abruptly, the statistics from previous frames model the current image poorly and the compression ratio can fall dramatically. After compressing a frame, the compression code can recognize that this has occurred (the compression ratio falls below a threshold), and recode the frame using the statistics that it computed during the unsuccessful compression of the frame using the old inefficient code tree. The new code tree can then be included in the output stream. Since abrupt changes in statistics are infrequent, the extra computation for encoding some frames twice has little impact on overall performance.

Figure 2:
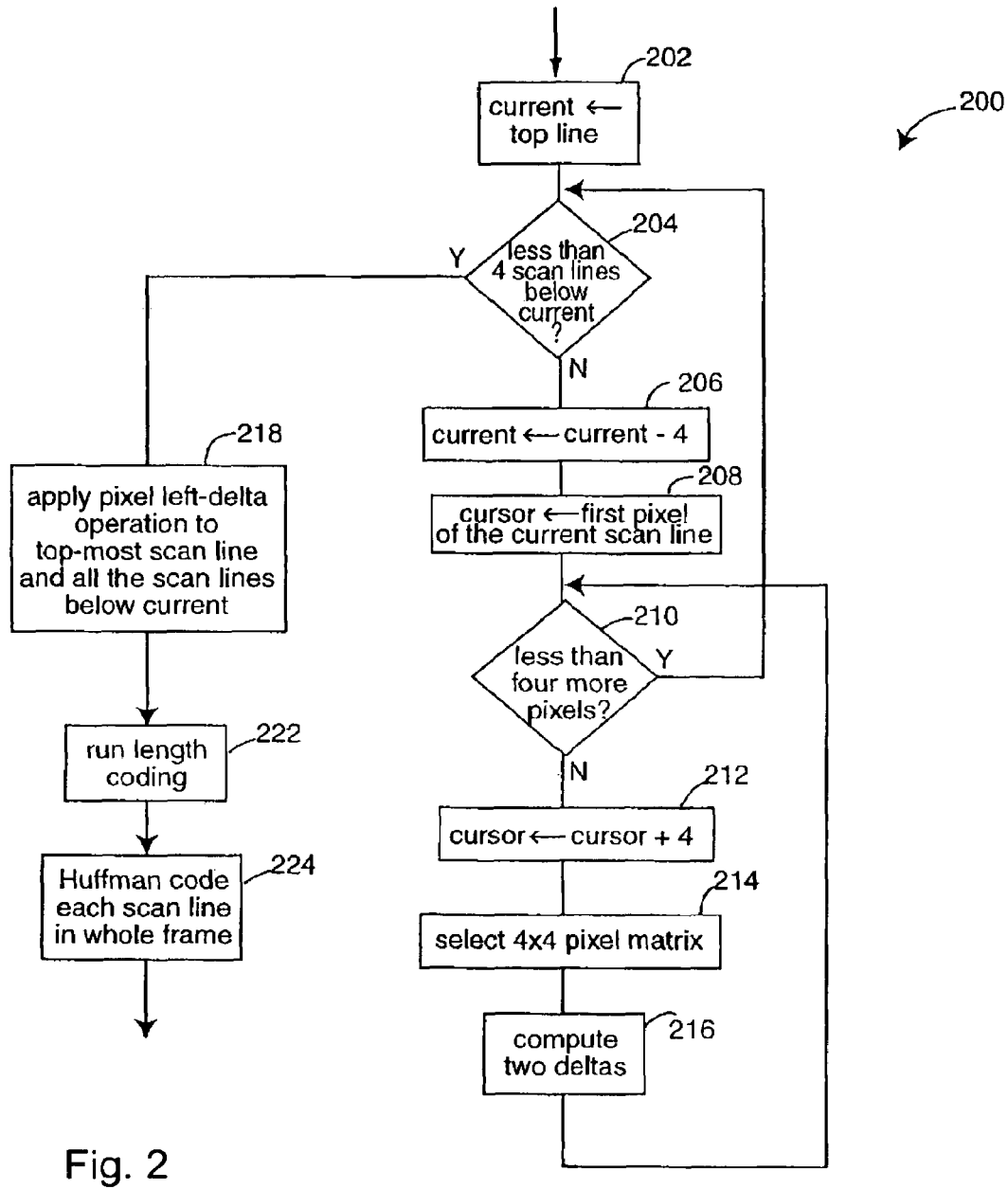
FIG. 2 is a flowchart of a video data compression sequence that uses two delta computations.

FIG. 2 represents a simple fast preprocessing best-neighbor compression method 200. Method 200 is similar to method 100, but it only computes the left-delta and above-delta.

A typical video stream for compression by method 200 comprises a series of video frames, each video frame comprises a number of scan lines, and each scan line includes a number of pixels. The method 200 comprises a step 202 that sets a current-scan-line address counter to the top scan line of a frame. A step 204 checks if there are less than four (n) scan lines left below the current scan line. If not, a step 206 lowers the current-scan-line address counter by four (n).

A step 208 sets a cursor address counter to the first, or left-most pixel of the current scan line. A step 210 checks to see if there are less than four (m) pixels to the right of the cursor. If so, control returns to step 204. Otherwise, a step 212 advances the cursor address counter to the right by four (m). A step 214 selects, for example, a four-by-four (n-by-m) pixel matrix with a cursor pixel at a bottom-right corner.

A step 216 computes two pixel-differential (delta) values for the selected pixel matrix, i.e., left delta and above delta. An evaluation measure is computed for each delta matrix resulting from the two delta operations. The delta matrix with the best (lowest) evaluation measure is selected. One marker is added to indicate which delta matrix was selected. The original matrix is replaced with the selected delta matrix and its marker. Huffman coding is then applied to the marker.

A step 218 applies pixel left-delta computation to the remaining scan lines below current and top most scan line. A step 222 applies run-length coding. A step 224 Huffman codes each scan line of the whole frame.

The evaluation measures mentioned for steps 116 and 216 are preferably equal to the sum of the absolute values of the all the pixels in a four-by-four (n-by-m) resulting delta matrix. If some pixel value differences cannot be computed because the pixel is at the edge of a frame, the evaluation value does not exist or is indicated. Consider the compression example represented in Table 1.

An alternative embodiment is to utilize another evaluation metric such as the maximum of the absolute values of the delta matrix.

TABLE 1

Compression Example

| 15 | 16 | 19 | 13 | 8  | 9  | 12 | 14 |
|----|----|----|----|----|----|----|----|
| 14 | 18 | 22 | 13 | 10 | 12 | 15 | 17 |
| 12 | 17 | 20 | 17 | 13 | 11 | 14 | 16 |
| 10 | 19 | 21 | 11 | 7  | 9  | 6  | 8  |
| 9  | 17 | 19 | 12 | 8  | 7  | 2  | 5  |

A first matrix to be processed is presented in Table 2.

TABLE 2

First Matrix

| 14 | 18 | 22 | 13 |
|----|----|----|----|
| 12 | 17 | 20 | 17 |
| 10 | 19 | 21 | 11 |
| 9  | 17 | 19 | 12 |

In the second row and second column there is a current value of 17. A left delta computes 17−12=5. An above-left delta computes 17−14=3. An above delta computes 17−18=−1. An above-right delta computes 17−22=−5. Each of the sixteen current pixel positions is similarly computed to generate a left delta matrix, a left-above delta matrix, an above delta matrix, and a right-above delta matrix. A completed left delta matrix produces an evaluation measure=nil for the first matrix in Table 2. The computation of a left-above delta matrix also produces an evaluation measure=nil.

An above delta matrix results in an evaluation measure=27, as in Table 3.

TABLE 3

Above Delta Matrix

| −1 | 2  | 3  | 0  |
|----|----|----|----|
| −2 | −1 | −2 | 4  |
| −2 | 2  | 1  | −6 |
| −1 | −2 | −2 | 1  |

A right-above delta matrix, as in Table 4, results in an evaluation measure=83.

TABLE 4

Right-Above Delta Matrix

| −2  | −1 | 9  | 5  |
|-----|----|----|----|
| −6  | −5 | −7 | 7  |
| −7  | −1 | 4  | −2 |
| −10 | −4 | 8  | 5  |

Therefore, the evaluation measure comparison shows that the above delta (A) is best for the first 4×4 pixel matrix. A second matrix is represented in Table 5.

TABLE 5

Second Exemplary 4 × 4 Matrix

| 10 | 12 | 15 | 17 |
|----|----|----|----|
| 13 | 11 | 14 | 16 |
| 7  | 9  | 6  | 8  |
| 8  | 7  | 2  | 5  |

A left delta matrix of such second matrix, as in Table 6, results in evaluation measure=38.

TABLE 6

Left Delta Matrix

| −3 | 2  | 3  | 2 |
|----|----|----|---|
| −4 | −2 | 3  | 2 |
| −4 | 2  | −3 | 2 |
| −4 | −1 | −5 | 3 |

A left above delta matrix results in an evaluation measure=59.

TABLE 7

Left Above Delta Matrix

| −3  | 4  | 6  | 5  |
|-----|----|----|----|
| 0   | 1  | 2  | 1  |
| −10 | −4 | −5 | −6 |
| −3  | 0  | −7 | −1 |

An above delta matrix results in an evaluation measure=51.

TABLE 8

Above Delta Matrix

| 2  | 3  | 3  | 3  |
|----|----|----|----|
| 3  | −1 | −1 | −1 |
| −6 | −2 | −8 | −8 |
| 1  | −2 | −4 | −3 |

A right above delta matrix results in an evaluation measure=nil.

Therefore, the evaluation measure comparison shows that the left delta (L) is best for the second 4×4 pixel matrix. Pixel left delta of the first scan line is represented in Table 9.

TABLE 9

Pixel Left Delta Of The First Scan Line

| 15 | 1 | 3 | −6 | −5 | 1 | 3 | 2 |

Table 10 represents a result.

TABLE 10

Result

| 15 | 1  | 3  | −6 | −5 | 1  | 3  | 2 |
|----|----|----|----|----|----|----|---|
| −1 | 2  | 3  | 0  | −3 | 2  | 3  | 2 |
| −2 | −1 | −2 | 4  | −4 | −2 | 3  | 2 |
| −2 | 2  | 1  | −6 | −4 | 2  | −3 | 2 |
| −1 | −2 | −2 | 1  | −4 | −1 | −5 | 3 |

Neighbor matrix markers are:

| A | L |
|---|---|

Huffman compression processing results in the Huffman code tree of Table 11.

TABLE 11

Huffman code tree

| pixel value | Huffman code | # of occurrences | total bits |
|---|---|---|---|
| 0 | 00010 | 1 | 5 |
| 1 | 010 | 4 | 12 |
| −1 | 0110 | 4 | 16 |
| 2 | 11 | 8 | 16 |
| −2 | 100 | 6 | 18 |
| 3 | 101 | 6 | 18 |
| −3 | 0111 | 2 | 8 |
| 4 | 00001 | 1 | 5 |
| −4 | 0011 | 3 | 12 |
| −5 | 0010 | 2 | 8 |
| −6 | 00011 | 2 | 10 |
| 15 | 00000 | 1 | 5 |
| Total | | 40 | 133 |

The compression ratio for this example is 200/(200−133):1=2.99:1.

In general, disclosed method embodiments compare the pixel value differences with the neighboring pixels and replace the pixel values with the smallest of the several differences. A marker is attached to a block of pixels, such that all the pixels in that block are compared with neighbors of one direction. The marker indicates how all the pixels in that block are compared.

Periodic Huffman code tree construction is used. Huffman coding is used to compress the resulting frame. A single Huffman code tree is constructed once every q number of frames. Since the frames do not change frequently, q can be set to thirty and still not cause much deterioration in compression ratio. When used for real-time video compression, the frequency of Huffman code tree construction is selected according to the instantaneous availability of processor time to perform the construction. When more processing time is available, the Huffman code trees are computed more frequently. The frequency variation is implemented by first checking the input video frame buffer. If the frame buffer is empty, then processor time for Huffman code tree construction is available.

Lossless compression of images has been implemented using the fact that color and brightness of the images change gradually on the surface so the values of neighboring pixels do not change drastically. In other words, each pixel is constrained by its neighboring pixels because the image data is not completely arbitrary.

Many compression methods are based on differential pulse code modulation (DPCM), which creates a "predictor" from some linear function of the pixels preceding a point in a scan line. The actual pixel value is replaced with a difference between the actual pixel value and the predictor. The predictor often equals the value of the immediately preceding pixel. In this way, the whole pixel values of the images are close to zero, and can be compressed either by using fewer bits to represent pixels or using Huffman coding to compress.

If each pixel were assigned its own marker indicating which comparisons were used, the total amount of data needed for such markers can be substantial, e.g., one quarter of the total. This overhead can be significantly reduced by dividing the image into a number of small n-by-m blocks. All the pixels in a block are assigned one marker. The one marker is attached to each block that indicates which of the four comparisons is selected. All the pixels in each block are compared with their neighboring pixels in a single direction. The shape and size of the block can take any form. In one embodiment, the n-by-m block dimension is set to be a four-by-four square matrix.

After all of the absolute pixel values have been preprocessed and reduced to small-numeric differential values, Huffman coding is used to compress the frame. But the Huffman coding of video can be time-expensive. Huffman coding consists of two phases, one to create the Huffman code tree for encoding, and a next to encode the pixels. The first phase Huffman code tree-generation processing time can require as much as the second phase time needed to encode the whole image. In order to reduce this time, tree generation may be performed once for several frames. Since the images do not change drastically between sequential frames, this often does not degrade the compression ratio.

Two different schemes can be used to set the frequency of Huffman code tree generation, one fixed and one variable. A fixed number of frames can be made to share a single Huffman code tree, e.g., thirty frames. The variable method generates Huffman code trees according to the processor power available at the time. The availability of processing power is assessed by looking at the number of entries in an input buffer that need to be compressed. Little or no work to do means more time can be spent on generating Huffman code trees more frequently.

A Huffman code tree is used to convert each code in the input video stream into a Huffman code. The Huffman code is a variable length code that is short in length for frequently occurring input codes and longer for less frequently occurring input codes.

A particular Huffman code tree is considered more efficient than other Huffman code trees if it can produce a smaller output file. A very efficient Huffman code tree can be created if the statistical distribution of the input video is known. However, the distribution of the code in the entire video for a real time compression system cannot be estimated. One approach is to use a predetermined Huffman code tree, which works satisfactorily for most input files. But this approach may fail badly for some special cases. The optimal approach is to create a Huffman code tree for each frame but this consumes too much computation time.

One assumption may be the nature of the video, i.e., that the content of frames do not change very frequently. The sequence takes a statistical distribution of codes for the first several frames, then creates a Huffman code tree. The Huffman code tree can be applied to the entire input video, but again this may work badly for some other parts of the video. Instead, the sequence creates a Huffman code tree from the first several (scanned) frames, e.g., three frames, then applies this Huffman code tree to convert a set of (coded) frames, e.g., 20. Using this method, the lengthy time required for the Huffman code tree generation can be averaged over a long period of time to the point of being an insignificant load for computation.

Alternative Embodiment

Best Neighbor Preprocessing & Huffman Coding With Adaptive Compression

Figure 1A:
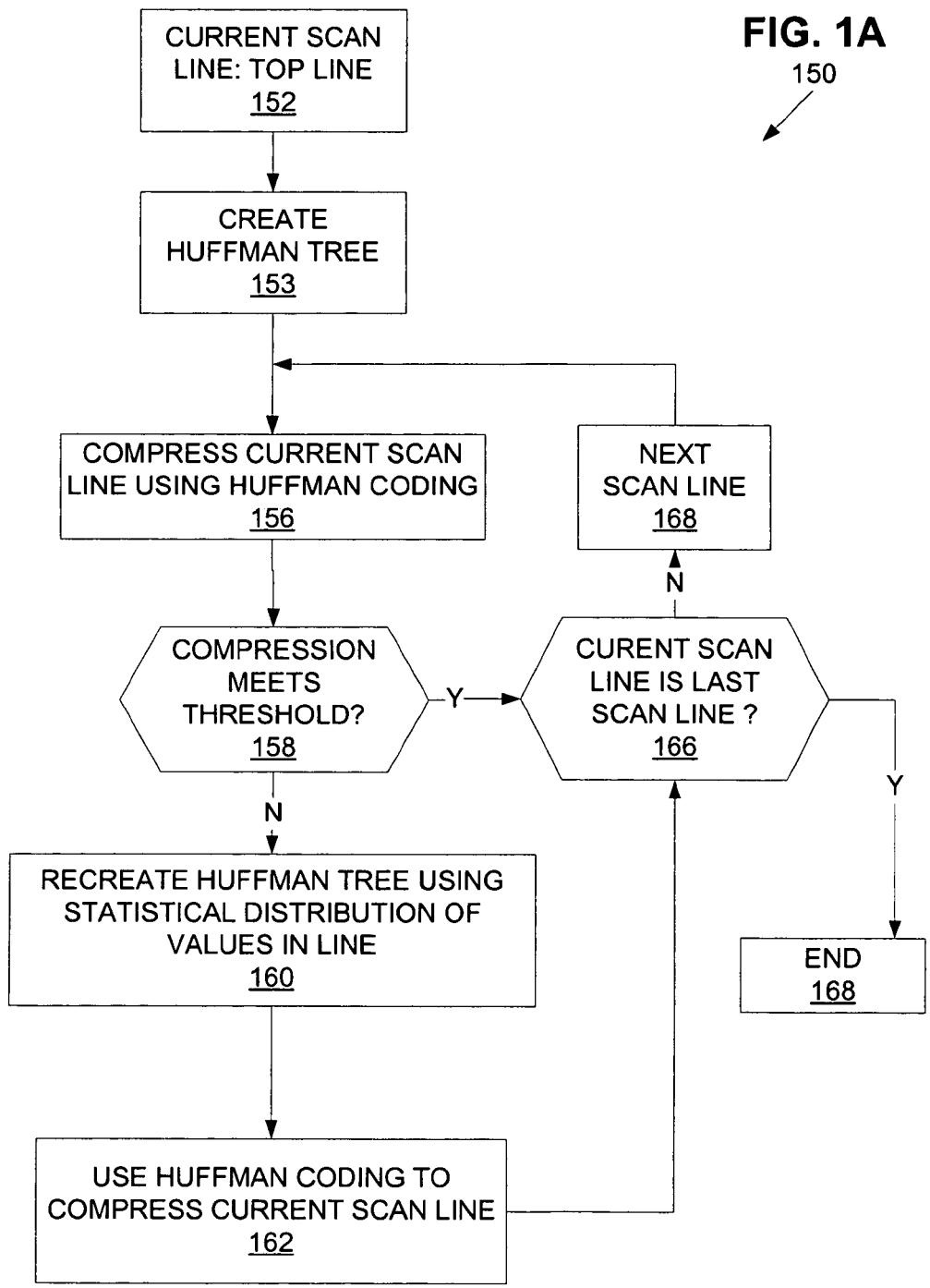
FIG. 1A is a flowchart showing an exemplary sequence for adaptive compression, implemented as an alternative to task 124, FIG. 1.

FIG. 1A depicts a sequence 150 providing an alternate embodiment of task 124 (FIG. 1) or task 224 (FIG. 2). The operations 150 are performed by one or more of the hardware entities discussed above, with the components of FIGS. 9-11 serving as several examples. Broadly, the sequence 150 implements an embodiment of adaptive compression, whereby the Huffman coding is performed line by line. If compression efficiency of any line fails to meet a given threshold, the Huffman code tree is recomputed and the line is recompressed using the recomputed Huffman code tree. Alternatively, instead of Huffman coding, the sequence may employ another type of entropy encoding such as range encoding, arithmetic coding, etc. For ease of explanation, with no intended limitation, the sequence 150 is described in context of the sequence 100 of FIG. 1.

As mentioned above, the sequence 100 performs best neighbor preprocessing of one video frame and then Huffman coding of the preprocessed video frame. The sequence 150, described as follows, provides an alternate embodiment of step 124.

To track the progression through scan lines of the current frame, step 152 sets a "current scan line" at the top scan line. Step 153 creates a Huffman code tree, and then step 156 compresses the current scan line using Huffman code tree of step 153. The creation of Huffman code trees and utilization of Huffman coding is well known in the relevant art, and it is widely discussed in a variety of technical publications. As an alternative, another type of entropy encoding may be utilized instead of Huffman coding, with some examples including range encoding and arithmetic encoding.

Step 158 asks whether the one-line compression performed in step 156 meets a specified threshold. As one example, the threshold may prescribe a given ratio between uncompressed and compressed line size. Although virtually any number may be utilized here, some particular examples include 2 to 1, 2.5 to 1, or 3 to 1. If the compression meets the threshold, then step 158 advances to step 166, which asks whether the current scan line is the last line of the current frame. If so, the program ends (step 168). Otherwise, step 168 advances the current scan line to the next scan line in the frame, and returns to perform step 156 as discussed above.

In contrast to the foregoing, if step 158 finds that the compression of step 156 did not meet the prescribed threshold, then step 160 is performed. Step 150 recomputes the Huffman code tree using the statistical distribution of the values in the previous scan line. Then, using the recomputed Huffman code tree, step 162 reapplies Huffman coding to the current scan line, and discards the results of Huffman coding of the current line from step 156. After step 162, step 166 is performed as discussed above.

A different embodiment preprocesses the image, collecting statistics while looking for an optimal division of the image into sub-parts (no more than a specified maximum number). Each subpart would be processed using its own Huffman code tree.

Alternative Embodiment

Pre-processing by Multidimensional Prediction

FIG. 1B depicts a multidimensional prediction sequence 170. The operations 170 are performed by one or more of the hardware entities discussed above, with the components of FIGS. 9-11 serving as several examples. To place this drawing in context of the previously described figures, sequence 170 may be performed as a preprocessing alternative to the sequences of FIG. 1 or 2. In this respect, sequence 170 may be performed in order to carry out step 309 (FIG. 3) or step 409 (FIG. 4).

Basically, the preprocessing sequence 170 replaces each pixel of a given video frame with that pixel's "error." Chiefly, the reason for preprocessing (computing 1-D, 2-D, or 3-D error) is to represent the video frame with a smaller amount of data, thereby improving future Huffman (or other entropy) compression. There are different embodiments for computing the pixel's error. Namely, there are 1-D, 2-D, and 3-D error computations. Each error computation has different advantages and features, so they are utilized in different applications, depending on the nature of the input video, availability of processing time, and other considerations.

The sequence 170 is now described in greater detail with reference to FIG. 1B. Step 172 receives a digital data input stream to process. In this example, the input stream comprises a digital video frame ("image"), which may be received, captured, scanned, sampled, or otherwise received so as to produce a data stream. Video is used merely as an example, however, as other data may be similarly amenable to encoding with the disclosed techniques. Furthermore, rather than a video "frame," other units of input video may be processed as appropriate to the particular application at hand. In the illustrated example, the input (172) comprises a continuous stream of data, representing lines of one video frame, then the next video frame in time, and so on.

Step 174 starts to process the input frame, establishing the location for a current ("subject") pixel. If the entire video frame has been received, the first pixel may be any pixel in the image. Or, if the pixels of the video frame are being sampled, captured, or otherwise received in real-time or some other serial order (such as a stream), then the current pixel begins with the first pixel in such order.

Next, step 176 computes the error of the current pixel. As mentioned above, this may comprise the 1-D error (step 176a), 2-D error (step 176b), or 3-D error (step 176c). In one application, the routine 170 is permanently programmed to always perform one of the options 176a-176c. In this case, the other options are just shown for illustrative purposes, as they would be absent from the routine 170. In another example, the routine 170 adheres to one of the options 176a-176c consistently for each video frame, stream, or other useful segment of the input stream, but the implemented option 176a-176c may vary from segment to segment. The selection between options 176a-176c may be based upon processing resource availability, detected compression efficiency, characteristics of the input stream, direction from a human user, random selection, or another appropriate factor. Alternatively, if sufficient computing resources are available, the image may be compressed with each of several options 176a-176c and the smallest compressed result chosen.

The operation 176a computes a 1-D error for the current pixel. As discussed in greater detail below, this involves predicting the current pixel based on pixel values in the same video frame row. The difference between the current pixel and the prediction constitutes the 1-D error.

The operation 176b computes a 2-D error for the current pixel. As discussed in greater detail below, this involves applying a predetermined function to pixels of multiple rows and multiple columns, hence "2-D." In one example, step 176b computes one or more 1-D errors for the current pixel, and further processes the 1-D error(s) to arrive at a modified error, which constitutes the 2-D error. In a simple illustration, computation of the 2-D error involves computing the 1-D error of a nearby pixel to the current pixel, and modifying the current pixel's 1-D error by subtracting the neighbor's 1-D error. This modified error is the current pixel's 2-D error. In an illustration of more involved computation, the 2-D error is found by combining several modified errors for the current pixel, each modified error computed using a different neighbor.

The operation 176c conducts three-dimensional prediction of the current pixel. This involves extending the 2-D prediction to also take into consideration pixels from one or more previous video frames. In other words, the 3-D error is a combination of the current pixel's 2-D error for the current frame and its 2-D errors from one or more previous frames.

In all cases above (176a-176c), the error computation only refers to pixels that have already been decompressed when the decompression algorithm processes the current pixel. This ensures that the decompression algorithm can compute the same prediction that the compression algorithm used.

After step 176 computes the current pixel's error, step 178 adds this error value to a record of error values for the current frame. This record is referred to as an "error frame." Step 184 next asks whether all pixels in the current video frame have been processed by steps 176, 178. If not, step 182 advances to the next pixel (making this the current pixel) and then returns to step 176. Step 182 may choose the next pixel according to any order, as long as the pixel chosen as "next" has been received in the input stream. One example of this order is the order of pixels in the input stream.

When step 184 finds that all pixels have been processed, then step 186 is performed. Step 186 applies run length coding to the error frame prepared in step 178. Run length coding is well documented in various patent documents, technical publications, and other reference materials. Optionally, step 186 may be omitted, for example, when circumstances are such that step 186 has the effect of enlarging the compressed frame size. Following step 186, step 188 compresses the error frame using Huffman coding, based upon a previously computed Huffman code tree and encoding table such as may have been computed in tasks 306-307 (FIG. 3) or tasks 406-407 (FIG. 4). Optionally, step 188 may employ the adaptive compression technique of FIG. 1A. Completion of step 188 concludes the sequence 170 for the current video frame. The sequence 170 may be repeated as desired to process further video frames.

The details of the 1-D, 2-D, and 3-D methods 176a-176c are explained below in greater detail with reference to FIG. 1C, which illustrates the positional relationship between a subject pixel and various nearby pixels of a current video frame. The array 190 has various rows and columns that make up the current video frame being processed. Various pixel positions are identified by codes as follows:

| | |
|---|---|
| S = | subject pixel |
| U = | one pixel above S |
| UU = | two pixels above S |
| RU = | one pixel up, one pixel right of S |
| L = | one pixel left of S |
| LL = | two pixels left of S |
| LLU = | one pixel up, two pixels left of S |
| LU = | one pixel up, one pixel left of S |
| LUU = | two pixels up, one pixel left of S |

The specific terms "video frame" and various "pixels" are employed as vehicles to explain the workings of the following processes. This explanation is made without any intended limitation, because these processes may be applied to virtually any other arrays containing various members, unrelated to video frames and pixels. Furthermore, the term "neighbor" is used to refer to any pixel of predetermined positional relationship to the current pixel, not necessarily adjoining pixels ("next-door neighbors"). Neighbor pixels may be nearby pixels, but need not have any specific proximity to the current pixel.

A. Computing 1-D Error

As mentioned above, the operation 176a computes a 1-D error for the current pixel. This involves predicting the current pixel based on pixel values in the same video frame row. The difference between the current pixel and the prediction constitutes the 1-D error.

An illustration is given to illustrate 1-D error computation in greater detail. A first operation predicts the current pixel based on other pixel values in the same video frame row. In this respect, the "one dimension" is the horizontal dimension. Thus, the predicted value of the current pixel is computed by applying a predetermined function to one or more other pixels in that row. One specific example of this function is where the current pixel's predicted value is a function of L and LL. This is expressed mathematically by Equation 1, below.

$$\text{prediction of } S = f(L, LL) \qquad [\text{Eq. 1}]$$

The next operation computes the current pixel's error, which equals the pixel's value in the subject frame minus the prediction of that pixel. This is expressed mathematically by Equation 2, below.

$$\text{error of } S = S - f(L, LL) \qquad [\text{Eq. 2}]$$

Various mathematical functions may be utilized to embody the function of Equations 1, 2. Some examples include one or more linear functions, nonlinear functions, fractals, wavelets, polynomial functions, etc.

One simple embodiment of the function is where the function of the two operands is always the first operand. This is expressed mathematically in Equation 3, below.

$$f(A, B) = A \qquad [\text{Eq. 3}]$$

B. Computing 2-D Error

The 2-D error computation is discussed now in greater detail. Namely, 2-D error is computed for the current pixel by applying a predetermined function to pixels of the subject pixel's row and other rows. This predetermined function may comprise any function of previous pixels to the subject pixel, namely, those to the left of the subject pixel and pixels from rows above the subject pixel. The function is therefore applied to pixels occurring earlier in the serial video stream. Equation 4, below, illustrates a generalized example of this function.

$$\text{prediction of } S = g(L, LL, LLU, LU, U, \ldots) \qquad [\text{Eq. 4}]$$

In one specific detailed embodiment, computation of the 2-D error is completed by computing the 1-D error of a neighbor pixel, and modifying the current pixel's 1-D error by subtracting the neighbor's 1-D error. This modified error is the current pixel's 2-D error.

The following illustrates a first example of the foregoing embodiment. Here, U is selected as the neighbor pixel. The 1-D error of U is computed by Equation 5.

$$\text{error of } U = U - f(LU, LLU) \qquad [\text{Eq. 5}]$$

The subject pixel's error was computed in Equation 2, repeated as follows.

$$\text{error of } S = S - f(L, LL) \qquad [\text{Eq. 2}]$$

The 2-D error in this example is the modification of the subject pixel's 1-D error by subtracting the neighbor's 1-D error, as shown in Equation 6.

$$2\text{-}D\ error = S - f(L, LL) - [U - f(LU, LLU)] \quad [\text{Eq. 6}]$$

Here is a second example, where RU is the neighbor pixel. The 1-D error of RU is computed by Equation 7.

$$error\ of\ RU = RU - f(U, LU) \quad [\text{Eq. 7}]$$

The subject pixel's error was computed in Equation 2, above. The 2-D error in this example is the modification of the subject pixel's 1-D error by subtracting the neighbor's 1-D error, as shown in Equation 8.

$$2\text{-}D\ error = S - f(L, LL) - [RU - f(U, LU)] \quad [\text{Eq. 8}]$$

Here is a third example, where LU is the neighbor pixel. The 1-D error of LU is computed by Equation 9.

$$error\ of\ LU = LU - f(LLU, LLLU) \quad [\text{Eq. 9}]$$

The subject pixel's error was computed in Equation 2, above. The 2-D error in this example is the modification of the subject pixel's 1-D error by subtracting the neighbor's 1-D error, as shown in Equation 10.

$$2\text{-}D\ error = S - f(L, LL) - [LU - f(LLU, LLLU)] \quad [\text{Eq. 10}]$$

Here is a fourth and final example, where L is the neighbor pixel. In order to capture image similarities along the horizontal direction, the following equations use different positional relationships than the respective equations above. The 1-D error of L is computed by Equation 11.

$$error\ of\ L = L - f(LU, LLU) \quad [\text{Eq. 11}]$$

In keeping with the spirit of capturing image similarities along the horizontal direction, the subject pixel is predicted using Equation 12 (below) rather than Equation 2 (above).

$$prediction\ of\ S = f(U, UU) \quad [\text{Eq. 12}]$$

The subject pixel's error is computed by Equation 13, below.

$$error\ of\ S = S - f(U, UU) \quad [\text{Eq. 13}]$$

The 2-D error in this example is the modification of the subject pixel's 1-D error by subtracting the neighbor's 1-D error, as shown in Equation 14.

$$2\text{-}D\ error = S - f(U, UU) - [L - f(LU, LLU)] \quad [\text{Eq. 14}]$$

In contrast to the four examples above, a completely different computation of 2-D error may be implemented by combining several modified errors for the current pixel, each modified error computed using a different neighbor. For instance, the 2-D errors for S computed in Equations 6, 8, 10, 14 may be averaged.

Broadly, when the 2-D error process is applied to a video frame over repeated performances of step 176*b*, the same group of pixels with given predetermined positional relationships to the subject pixel is utilized throughout processing of that frame. With the foregoing examples, each performance of step 176*b* utilizes the same neighbor pixels, e.g., U, RU, LU, and/or L. In another example, the operation 176*b* may vary the neighbor pixels (i.e., positional relationships to the subject pixel) from one frame being processed to another frame. The selection or change between sets of predetermined positional relationships may be implemented based upon various considerations, such as compression ratio, color distribution, and the known type of content (e.g., video, computer generated graphics, etc.).

C. Computing 3-D Error

As mentioned above, the operation 176*c* conducts 3-D prediction of the current pixel. This involves extending the 2-D prediction to also take into consideration pixels from one or more previous video frames. The 3-D prediction may be implemented utilizing any function of pixels from the subject pixel's current and one or more past video frames.

As a more specific example of 3-D prediction, a 3-D error may be computed by combining the subject pixel's 2-D error for the current frame and its 2-D errors from one or more previous frames.

Figure 1C:
FIG. 1C is a table illustrating the relationship between a current member and various nearby members of an input array, shown for a current time.
Figure 1D:
FIG. 1D is a table illustrating the relationship between the current member and various nearby members of an input array, shown for a given time in the past.

FIG. 1D illustrates the positional relationship between the subject pixel and various nearby pixels, utilizing values for these pixels as they occurred in a past video frame 192. The past video frame 192 may occur one, two, or any number of frames prior to the current frame 190 (FIG. 1C), depending upon how the program 176*c* is implemented. In the present example, the past frame 192 is the frame occurring immediately prior to the current frame 190.

With FIGS. 1C-1D in mind, a specific example of 3-D error computation can be discussed. First, the subject pixel's 2-D error is computed as shown above, utilizing the current frame 190. As mentioned above, this may be computed using one, two, three, or any desired number of nearby pixels. Next, computation is performed to obtain the subject pixel's 2-D error for one or more past frames, which in this example is the immediately previous frame 192. Computing the difference between the current 2-D error and the past 2-D error yields the 3-D error.

Overall Compression Sequence—Basic Routine

Figure 3:
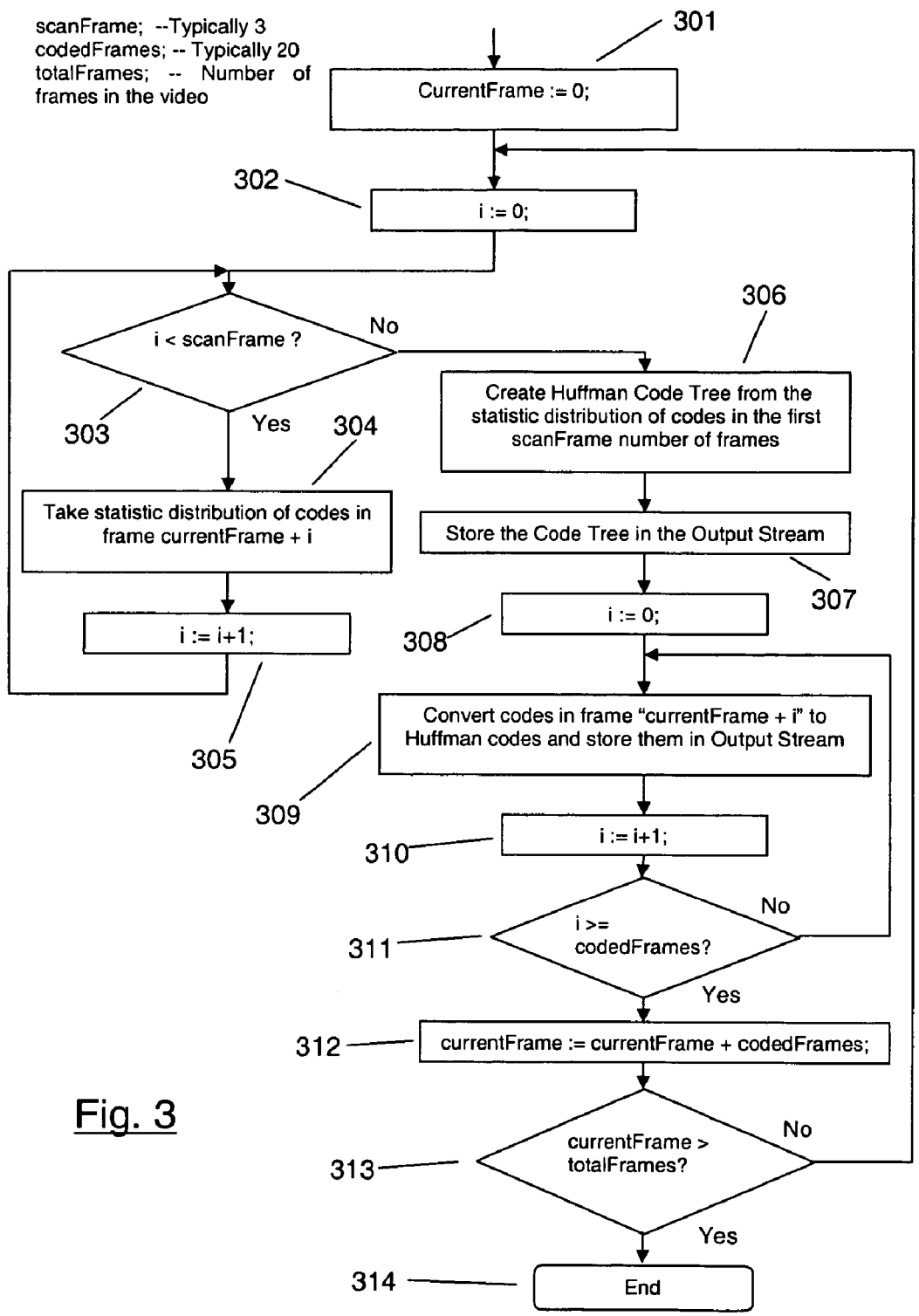
FIG. 3 is a flowchart for the coding of frames of an input video stream by creating a Huffman code tree using a statistical distribution from a series of frames and applying the Huffman code tree to a longer series of frames.
Figure 4:
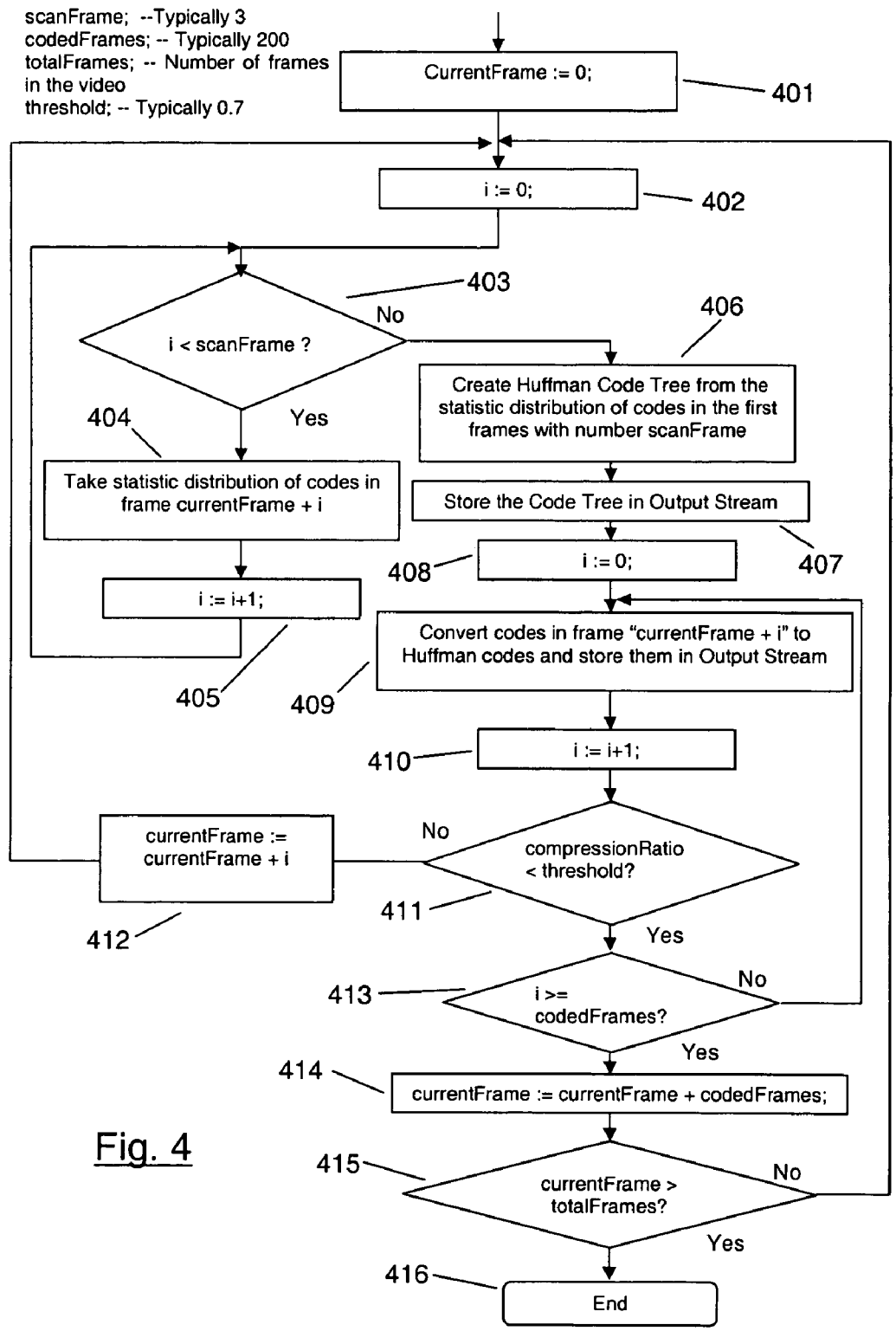
FIG. 4 is a flowchart for the coding of frames of an input video stream by creating a Huffman code tree using a statistical distribution from a series of frames, applying the Huffman code tree to a longer series of frames, and creating another Huffman code tree when the compression ratio falls below a certain threshold.

FIG. 3A describes an overall encoding (compression) sequence 350. Two exemplary implementations of the sequence 350 are illustrated below in the form of FIGS. 3-4. The operations 350 are performed by one or more of the hardware entities discussed above, with the components of FIGS. 9-11 serving as several examples. To place this drawing in context other figures, sequence 350 may be performed as an overall compression routine, which employs one of the preprocessing routines of FIGS. 1, 1A, or 2 in step 358 as described below.

Step 352 performs a statistical distribution based upon a number N1 of frames. In one specific example, N1 is three frames. In one example, the statistical distribution comprises a histogram. Step 354 creates a Huffman code tree based the statistical distribution of step 352. Step 356 stores the Huffman code tree in the output stream, for later use in decoding the encoded output sequence. Although Huffman coding is given as one example, other embodiments may utilize range encoding, arithmetic encoding, or other types of entropy encoding.

Step 358 converts the pixel values in multiple frames into Huffman codes, and stores them in the output stream. Step 358 operates on N2 frames, a number which may be larger than N1. In one example, N2 is twenty. In one example, step 358 may be implemented by performing one of FIGS. 1, 1A, or 2 for each frame, based upon the current Huffman code tree/coding computed during the last performance of step 354.

As an optional enhancement to step 358, step 366 detects the compression ratio of each frame compressed in step 358. If the compression ratio of any frame fails to meet a prescribed threshold, step 358 aborts compression of the remaining frames in step 358 and proceeds to step 359. Step 359 advances to the next frame, and then returns to step 352 to recomputed the statistical distribution (step 352) and then to recomputed the Huffman code tree (step 354). In one example, steps 366, 359 may be implemented by steps 411, 412 of FIG. 4, discussed in greater detail below.

Upon successful completion of step 358, step 360 asks whether all frames in the input stream have been processed. If not, step 364 proceeds to the next N2 frames, and returns to step 352. When step 360 finds that all frames have been processed, the routine 350 ends in step 362.

Overall Compression Sequence

First Embodiment

Referring to FIG. 3, this sequence keeps the two numbers (scanned and coded) constant for the entire file or it can change the number of frames to apply the Huffman code tree to. This sequence uses a counter to count the number of frames that are coded 301. This sequence first goes through the scanning process where a scanFrame number of frames are scanned and a statistical distribution is performed on the codes in the frames 302, 303, 304, 305. ScanFrame is three in this example.

A Huffman code tree is created using the statistical distribution of the scanned frames 306. The Huffman code tree is then stored in the output stream so it can be retrieved during the decompression stage 307. The disclosed sequence uses the Huffman code tree to convert the codes in the set of codedFrames that includes the scanned set of frames and stores the resultant Huffman codes in the output stream 308, 309, 310, 311. CodedFrames in this example is equal to 20.

The disclosed sequence repeats this process for all of the frames in the video (totalFrames) 312, 313 until the all of the frames in the video are converted 314.

Overall Compression

Second Embodiment

Referring to FIG. 4, if the compression ratio becomes low, it may be because the scene has changed and the statistics of the codes in the frames have become very different. The disclosed sequence recreates the code tree when this occurs. As in FIG. 3, the sequence of FIG. 4 uses a counter to count the number of frames that are coded 401. The sequence goes through the scanning process where a scanFrame number of frames are scanned and a statistical distribution is performed on the codes in the frames 402, 403, 404, 405. ScanFrame is three in this example.

A Huffman code tree is created using the statistical distribution of the scanned frames 406. The Huffman code tree is then stored in the output stream so it can be retrieved during the decompression stage 407. The disclosed sequence uses the Huffman code tree to convert the codes in the set of codedFrames that includes the scanned set of frames and stores the resultant Huffman codes in the output stream 408, 409, 410, 411, 413. CodedFrames in this example is equal to 200.

If the compression ratio of a frame falls below a threshold value (typically 0.7), indicating that a scene most likely has changed, the disclosed sequence sets the currentFrame at the next frame 412 and goes back to the scanning process 402, 403, 404, 405, to create a new Huffman code tree 406, 407.

The sequence repeats this process for all of the frames in the video (totalFrames) 414, 415 until the all of the frames in the video are converted 416.

The Huffman code is encoded using a look up table for fast encoding. However, since the Huffman algorithm converts a short code to a variable length code, there are some codes that can be very long. Typically, if the input code is eight bits in length, the maximum length of the Huffman code generated is about 30-bits. Encoding is implemented in a relatively straight forward way using a lookup table of 256 entries for an eight-bit input code as exemplified in Table 12.

TABLE 12

Huffman code encoding table with 256 entries

| Number of bits in the output code | Code (in binary) |
|---|---|
| 2 | 00 |
| 2 | 01 |
| 4 | 1000 |
| . | . |
| . | . |
| . | . |
| 30 | 100111111 ... |

Decoding Table: Various Approaches

Decoding, on the other hand, is more complicated and time consuming because it is not possible to implement a look up table for long codes. If the maximum Huffman code length is 30-bits, then a table must be created with one billion entries—which is not feasible even in a modern day computer main memory.

Most Huffman decoding splits the code into two parts in order to fit in main memory and also to run faster. The two parts are: fixed length prefix; and variable length remainder. The disclosed sequence uses the fixed length prefix as an index to a look up table as exemplified in Table 13.

Given a modern day computer with several levels of memory hierarchy, it is desirable to fit the look up table in the fastest memory called the cache memory. The typical personal computer has 256 K bytes of cache memory, which means that illustrated sequence can use the prefix of size 11 bits (this can change as computers advance and larger cache sizes become more common). Most pixels are encoded with codes that fit into 11 bits because of the nature of Huffman coding, that is, more frequently occurring input codes are assigned shorter output codes.

TABLE 13

Huffman code decoding table with 2048 entries
(table indexed by 11 bits from the input stream)

| Number of bits in the code | Output code or Pointer to Search Table |
|---|---|
| 7 | 01111111 |
| 11 | 00111111 |
| 13 | Pointer to -> Search table A |
| 15 | Pointer to -> Search table B |
| . | |
| . | |
| . | |
| 2 | 00001111 |

However, if the code does not fit into 11 bits, the rest of the codes are left in the remainder part. The typical way to handle the conversion of the remainder part is to use a search table. The first look up table's entry will point to another table if the output code that starts with the particular prefix is longer than 11 bits. In this overflow table as exemplified in Table 14, entries are pairs of numbers, the remainder and the target code. If the first lookup table indicates that the code is longer than 11 bits, then the overflow table is searched with the remainder as a comparison index (or associative look up), which is compared with the next bits of the input stream. If there is a matching entry, then the corresponding target code is output. This is, however, tremendously time consuming. So typically a hash table is used to speed up the search.

TABLE 14

Overflow Search Table A

| Number of bits in the Remainder | Remainder | Output code |
|---|---|---|
| 2 | 01 | 10010001 |
| 9 | 010101010 | 10010010 |
| 6 | 101010 | 10010011 |
| . | . | . |
| . | . | . |
| . | . | . |
| 5 | 11100 | 10010000 |

Even a hash table is slow, requiring several look ups. So it is not be perfectly satisfactory. Instead, the disclosed sequence uses a concatenated code. When generating a Huffman code, if the output is longer than 11 bits, then the result will be a 19 bit code created by concatenating the 11 bit prefix and the eight bit input code. A decoding table entry will be either the length of the prefix and eight bit output code if the prefix is shorter than or equal to 11 bits, or an indicator saying that the code is longer than 11 bits. A decoding table is exemplified in Table 15.

TABLE 15 decode Table for concatenated code with 2048 entries

| Field numBits (Number of bits in the code) | Field outputCode (Output code) |
|---|---|
| 2 | 00001111 |
| 4 | 00110011 |
| 19 | N/A |
| 19 | N/A |
| 11 | 01010101 |
| . | . |
| . | . |
| . | . |

Decoding Method

Figure 5:
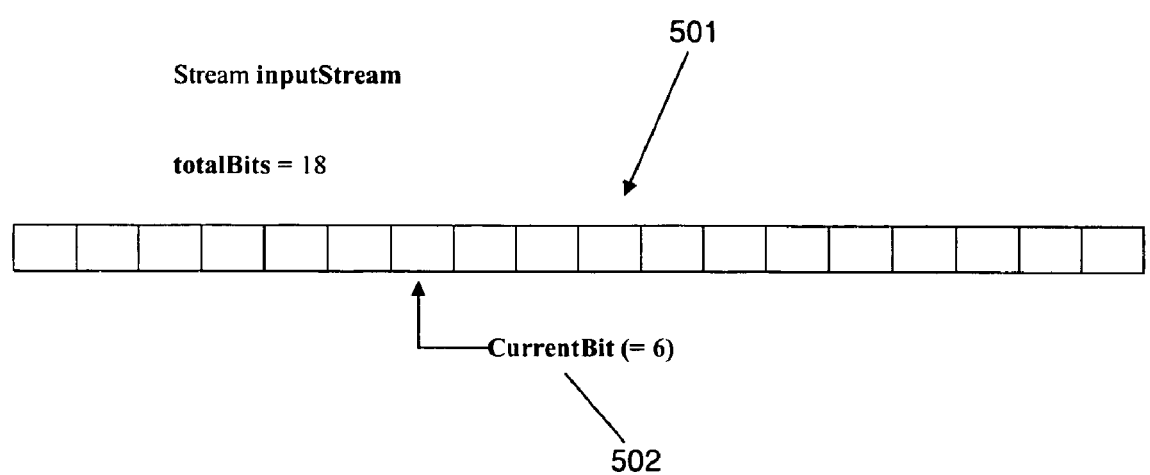
FIG. 5 is a block schematic diagram of an input stream and a current bit pointer.
Figure 6:
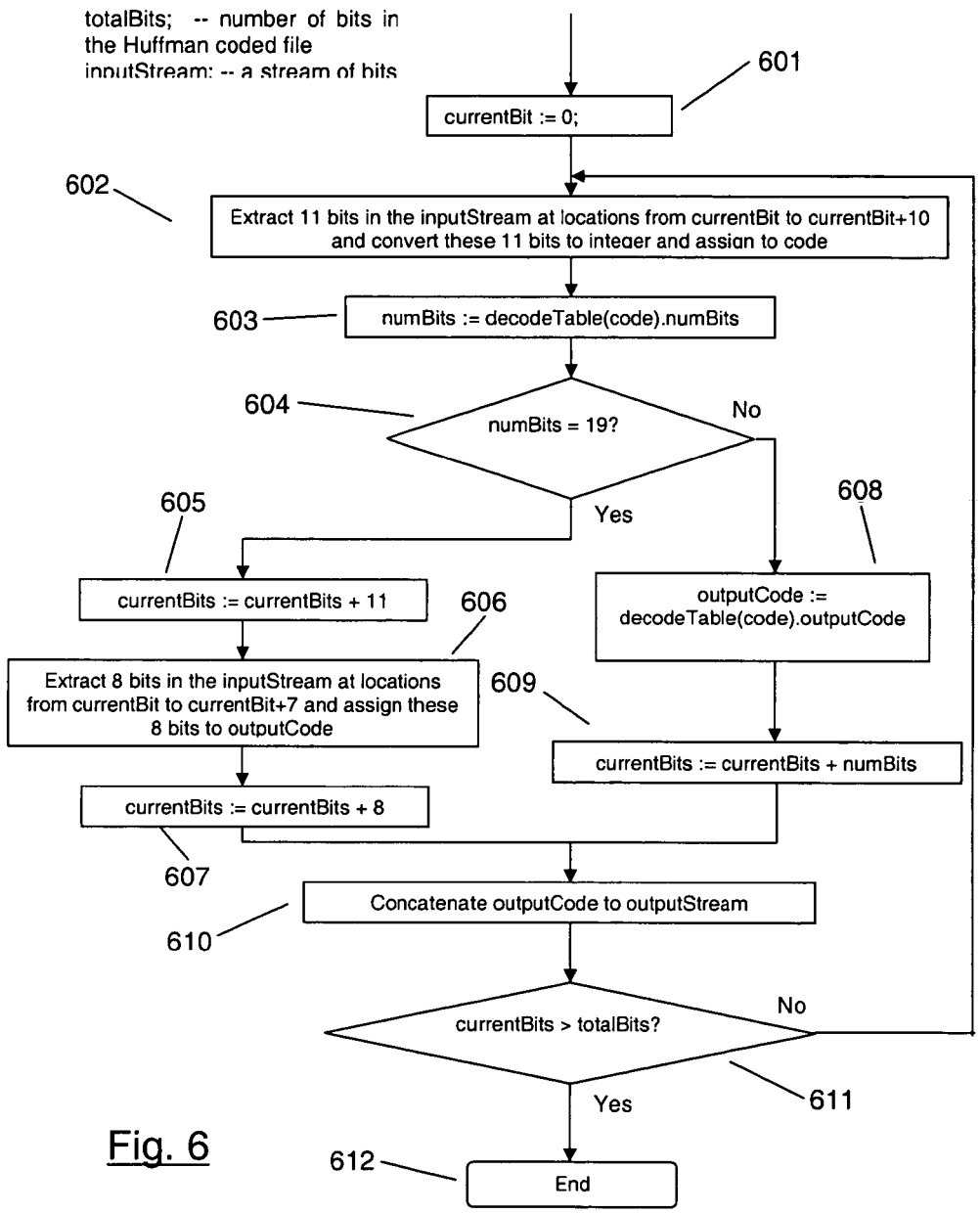
FIG. 6 is a flowchart for the decoding of frames of an input stream using a concatenated code approach and a decode table.

With respect to FIGS. 5 and 6, the concatenated code Huffman decoding method is shown. The illustrated sequence processes the input stream 501 by walking through the stream using a currentBit pointer 502, 601. A code is calculated from the input stream 501 using the currentBit and the following ten bits 602. The decodeTable, as shown in Table 15, is used to look up the calculated code to find the number of bits in the code 603.

If the number of bits is 19, then the sequence takes the eight bit input code by indexing into the input stream and appends the code to the output stream 605, 606, 607, 610. If the number of bits is not 19, then the sequence takes the output code from the decodeTable and appends the output code to the output stream 608, 609, 610.

To those skilled in the relevant art (having the benefit of this disclosure), it will be apparent that this algorithm may be adapted to work with pixels of images other than eight bits.

The process is repeated 611 until the bits in the input stream 501 are consumed 612

The above method has the advantage of avoiding costly search for exceptional codes at the expense of an increase in compressed file size of about 10% in the worst case.

Multi-Symbol Decoding

A. Introduction

Figure 6A:
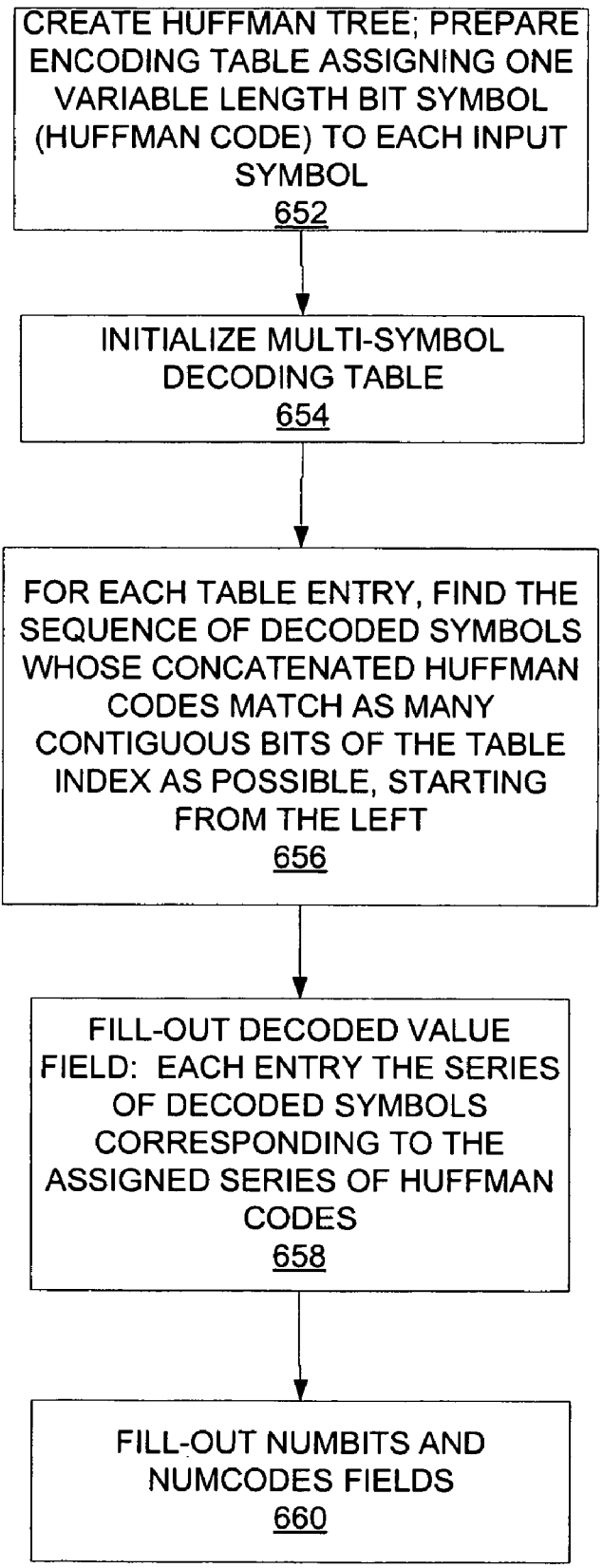
FIG. 6A is a flowchart of a process for preparing a multi-symbol coding table.
Figure 6C:
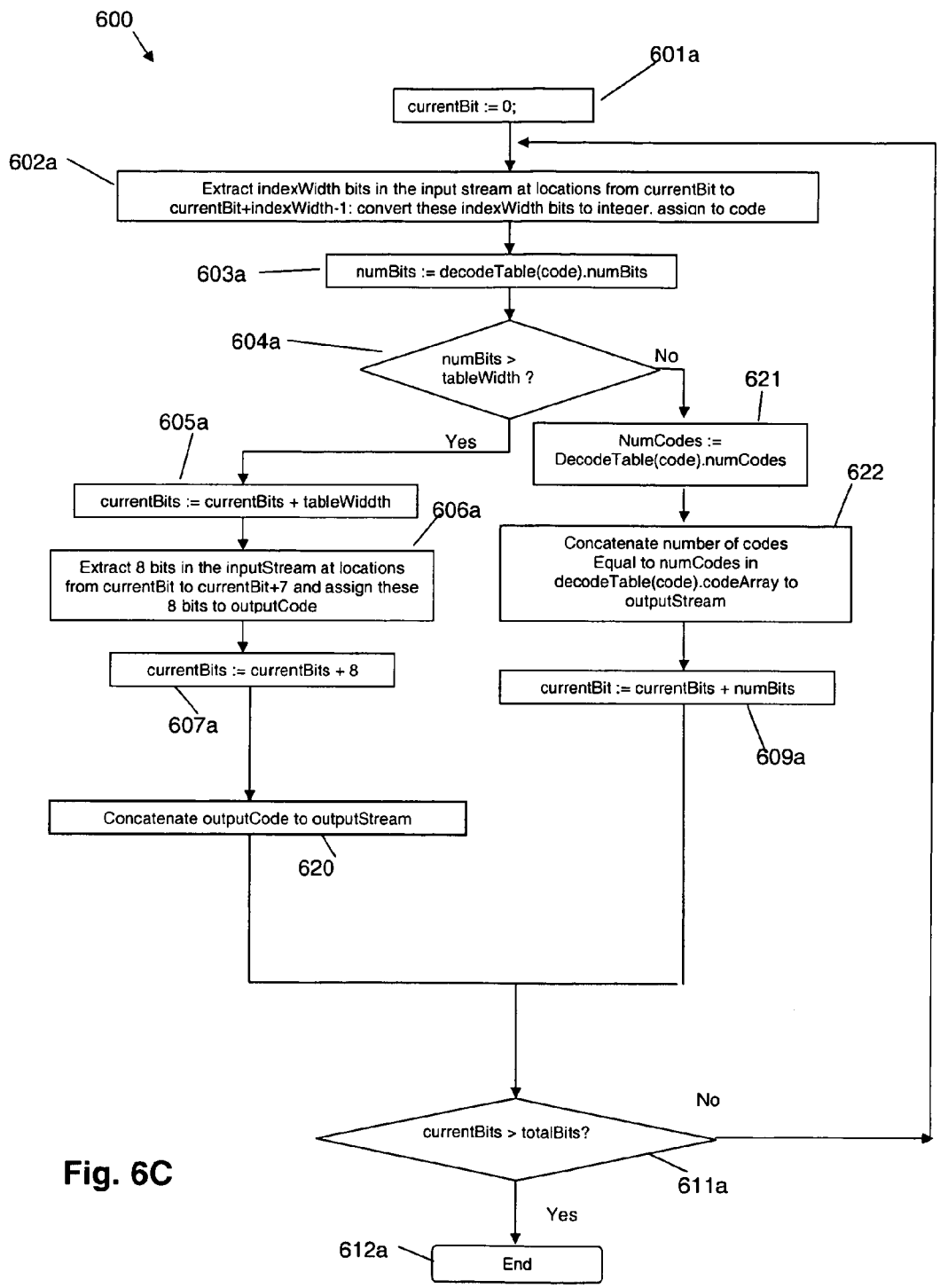
FIG. 6C is a flowchart of a process for performing multi-symbol decoding utilizing a table prepared according to FIG. 6A, such as the table of FIG. 6B.

With reference to FIGS. 6A-6C, an alternative is described to the foregoing decoding scheme. Broadly, this process makes it possible to decode a chunk of encoded data, even if the chunk contains multiple Huffman codes, rather than having to individually decode each Huffman code in the encoded data. Depending on the manner of implementation, this may substantially speed the process of decoding encoded data. With this process, encoding may be performed by any applicable technique (such as one of the processes shown above), without requiring any changes to the decode table. However, the decode process utilizes a novel decoding table, referred to as a multi-symbol decoding table.

B. Multi-Symbol Decoding Table

FIG. 6B illustrates an example 670 of a multi-symbol decoding table. As with the previously described method, the table 670 includes a number of rows ("entries"). As explained below, each entry includes the row number 671 ("index"), number of bits ("numBits") 672, number of codes ("num-Codes") 674, and decoded values 676 ("codeArray").

Each row in the table has an address. Each row's address is given by the row's index 671. As an alternative, where each row's address is its row number (e.g., first row is row address 1, second row is row address 2, etc.), the rows' addresses are inherent to the table 670, and the index column 670 may be omitted. The index 671 also represents an anticipated chunk of data from a decoded data stream. In the illustrated example, the chunk of data is eleven bits long, since the width of the field 671 (indexWidth 678) is eleven. Since the lengths of Huffman codes vary, each index 671 may contain zero, one, or more Huffman codes.

For each row, the column 676 lists the decoded values, in order, corresponding to the Huffman codes within the index 671. For example, in the row with index value 00011101100, this index value contains three Huffman codes that are decoded into "a," "b," and "x" values. In the row with index value 11011001011, there are three Huffman codes that are decoded into the values "x," "a," and "r." The relation between the decoded values in the column 676 and the Huffman codes (concatenated into some or all of the index 671) is given by the appropriate Huffman encoding table(s), such as Table 12 discussed above.

In most rows of the table 670, then, some or all of the row's index bits represent one or more Huffman codes, which are decoded in the field 676. The numBits field 672 indicates how many bits of the index are decoded in the field 676. For each row, the numCode field 674 indicates how many Huffman codes are present in the row's index 671.

In an alternative embodiment, numCode may be omitted, and this information is derived by looking at how many values are in the field 676. Still another alternative is to eliminate the decoded value field 676 and repeating normal Huffman decoding numCodes times to completely decode the current 11 bit sample.

If numBits is greater than the index width 678 (eleven, in the present example), this indicates that the Huffman code corresponding to this index 671 is longer than eleven bits, and will require part of the next input stream sample to decode it. Therefore, in this case, the index 671 only contains part of a Huffman code. The row with index value 01010101010 is an example of this. Here, the number of bits field 672 indicates twelve. This does not make sense, since there cannot be twelve bits of the index 671 that correspond to decoded values—the index field 671 only contains eleven bits in this example. Therefore, when numbits 672 is greater than index-Width 678, this signals that the Huffman code corresponding to the index does only represents part of a Huffman code. Accordingly, numCodes 674 and codeArray 676 are blank or contain a value such as N/A, null, etc.

Another embodiment is to construct the table with each entry to be either a single 32-bit or 64-bit word. So that each table lookup consists of a peak into each table entry to a single 32-bit or 64-bit word, which contains a 4- or 5-bit field for the number of bits, and space for a fixed number of decoded symbols, and a flag for each symbol saying whether it is present or not. If the code can not be represented, the number of bits is encoded as zero and the rest of the entry is a pointer into a search table.

As shown above, each index value 671 contains zero, one, or more Huffman codes that represent the same number of decoded values. Column 672 indicates the number of index bits that are utilized to represent the decoded values 676. The remaining bits of the index begin the next Huffman code, which is not amenable to decoding with this chunk of data. The column 674 tells how many different decoded values 676 are represented by the index value 671.

In other words, the column 672 provides a bit-number specifying how many bits of the index value 671 are decoded by the subject entry. The column 676 contains a number of decoded output values, where a first bit-number bits of the index value 671 comprise a concatenated Huffman coding of all the decoded output values. The column 674 provides a code-number indicating the number of decoded output values provided in the column 676.

In the description of the decoding sequence of FIG. 6C (below), the value of the fields 672, 674, and 676 are referred to as "numBits," "numCodes," and "codeArray," respectively.

Although the foregoing example discusses a table, and a table does indeed provide one example, this disclosure is not limited to "tables." The table 670 may alternatively be implemented utilizing a variety of other tools such as linked lists, relational databases, hash tables, data structures, programs, etc.

C. Creating the Multi-Symbol Decoding Table

FIG. 6A describes a process 650 to create a multi-symbol decoding table. The operations 650 are performed by one or more of the hardware entities discussed above, with the components of FIGS. 9-11 serving as several examples. In the context of previously illustrated diagrams, the process 650 of creating the table may be performed at an appropriate time, such as during performance of step 306 (FIG. 3) or step 406 (FIG. 4).

Step 652 creates a Huffman code tree and assigns variable length bit symbols (Huffman codes) to each input ("unencoded") symbol. The creation of Huffman code trees is well known in the relevant art, and it is widely discussed in a variety of technical publications. Alternatively, range encoding, arithmetic coding, or another type of entropy coding may be utilized.

Step 654 initializes a multi-symbol decoding table 670. As part of step 654, indexWidth 678 is established. The width 678 is chosen based upon various factors. For example, if the decode process will be performed with a particular processing machine, then indexWidth 678 may be determined by memory hierarchy such that the decoding time is fastest. As another consideration, the width 678 may be selected as follows: the maximum number of rows (entries) of the table chosen to equal a desired number (such as the maximum binary value of the processing machine's bus), and then the table width selected as the smallest width that will accommodate the largest width of decoded values corresponding to the Huffman index. As still another consideration, the width 678 may be selected to ensure it is long enough to accommodate the mostly frequently expected combination of decoded values.

Step 656 fills the table 670. Namely, step 656 enters the appropriate sequence of Huffman codes in each table entry such that the bit sequence created by concatenating the Huffman codes in the sequence matches the prefix of the table index 671, and adding any more Huffman codes exceeds the width 678. In other words, for each table entry, step 656 treats the index 671 as a series of concatenated Huffman codes, and decodes the Huffman codes to provide decoded values that step 656 places into the field 676. Any leftover bits at the end of the index are ignored. At the conclusion of step 656, each decoded value field 676 contains the longest possible series of decoded symbols corresponding to the assigned series of Huffman codes from the index 671, as shown by step 658.

Step 660 completes the fields 672, 674. The field 672 indicates the number of bits of the index 671 that are represented by decoded values in the field 676. As far as the decoding table goes, unused trailing index bits are ignored. For each table entry, the field 674 indicates how many decoded values are contained in the field 676.

In one embodiment for application to real world video comprising multiple color channels such as R, G, and B channels or Y, Cr, and Cb channels, multiple symbol tables are created, where each symbol table uses its own Huffman code tree.

D. Decoding Utilizing Multi-Symbol Decoding Table

FIG. 6C illustrates a decoding process 600 utilizing a multi-symbol decoding table. The operations 600 are performed by one or more of the hardware entities discussed above, with the components of FIGS. 9-11 serving as several examples. Without any intended limitation, and to aid in a concise explanation, the process 600 is discussed in the particular context of the table 670 (FIG. 6B).

Initially (not shown), the process receives an encoded data stream. This is the data stream to be decoded. Sequence 600 processes the input stream by advancing through it using a pointer (called "currentBit"). Step 601a sets the pointer to a first bit or other applicable starting position of the input data Step 602a analyzes a number of bits beginning at the currentBit pointer. The number of bits analyzed here is indexWidth 678, and this is referred to as the current sample. Without any intended limitation, indexWidth 678 is eleven in the present example.

Step 603a indexes the current sample to the table 670 via the index 671 to identify the corresponding table entry (row), and looks up the value of numBits 672 for this row. As mentioned above, the numBits value indicates the number of index bits that are decoded in the decoded value column 676.

Step 604a asks whether numBits is greater than indexWidth 678. If so, this means that the current sample represents part of a Huffman code that is too large to fit in the index 671. Therefore, the current sample does not represent event one complete Huffman code. In this case, step 604a advances to step 605a. Step 605a advances the currentBit pointer in the input stream by indexWidth 678.

Next, step 606a considers the next eight bits. In one example of step 606a, these eight bits indicate comprise the ASCII or other output representation of the single, identified output code, as discussed above in conjunction with FIG. 6 and Table 15. In a different example of step 606a, these eight bits are considered along with the current sample (for a total of 8+11=19 bits), and handled as discussed above in conjunction with FIG. 6 and Tables 13-14. In still another embodiment, the multi-symbol table is implemented using the long Huffman code without escape symbols; this utilizes pointers to a search table, but it may achieve an improved compression ratio under some circumstances.

After step 606a, step 607a advances the pointer by eight bits, that is, to next bit after the eight bits newly sampled in step 606a. This readies the pointer to process the next sample when step 602a is performed next. After step 607a, step 620 takes the final value found in step 606a and provides it as an output, for example, adding it to the output stream.

After step 620, step 611a asks whether the pointer has reached the end of the input stream. If so, the routine 600 ends in step 612a. Otherwise, if the currentBits pointer has not reached the end of the input stream, the routine 600 returns to process more bits in step 602a.

In contrast to the foregoing description, if step 604a finds that the numBits field of the current sample's entry in the table 670 does not exceed indexWidth 678, then steps 621, 622, 609a are performed instead of steps 605a, 606a, 607a, 620.

Step 621 utilizes the current sample to index the table 670 at the appropriate row, and then looks up the corresponding value of numCodes in field 674. As discussed above, this reveals the number of Huffman codes present in the corresponding index value. Step 622 then repeatedly performs Huffman decoding upon bits of the current sample until numCodes different Huffman codes are decoded. As an alternative, step 622 may output the decoded values as listed in the field 676. In either case, the decoded values are appended to the output stream in step 622.

In step 609a, the currentBit pointer is advanced by the numBits value 672 corresponding to the sample that was processed in step 622. For example, if six bits of the last sample represented one or more Huffman codes (i.e., numBits 672 was six), then step 609a advances the currentBit pointer by six bits. This leaves the remaining five bits of the last sample to be re-analyzed when the next sample of eleven bits (including these five bits) is taken in step 602a.

After step 609a, step 611a asks whether the pointer has reached the end of the input stream. If so, the routine 600 ends in step 612a. Otherwise, if the currentBits pointer has not reached the end of the input stream, the routine 600 returns to process more bits in step 602a.

Task Overview

Figure 7:
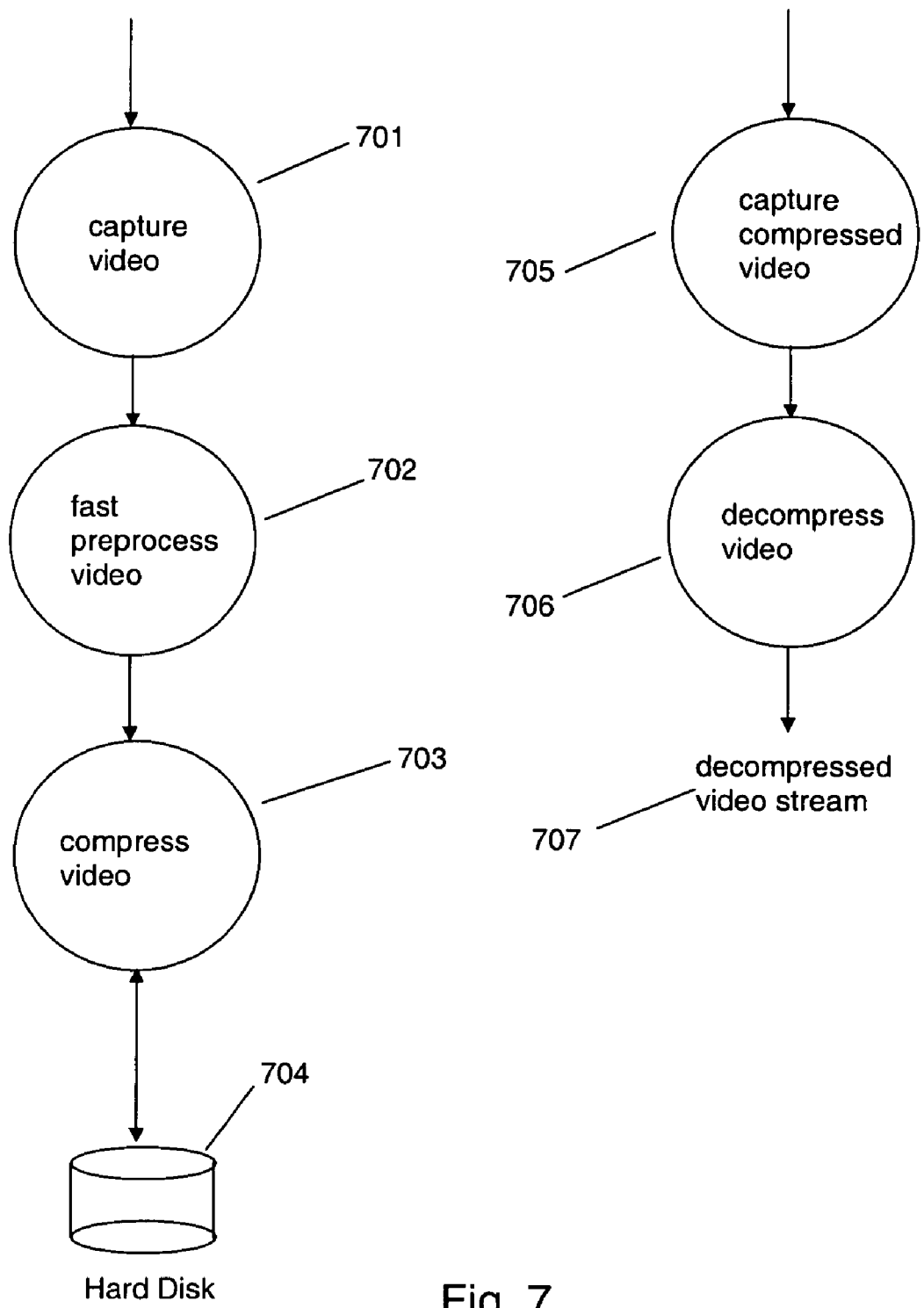
FIG. 7 is a block schematic diagram of a task viewpoint showing compression and decompression stages.

Referring to FIG. 7, a task viewpoint is shown. On the compression side, the capture video task 701 captures the video stream that is to be compressed. The video stream is fed to the fast preprocess video task 702 which preprocesses the video as described above and in FIGS. 1 and 2. As the frames in the video are preprocessed, they are passed to the compress video task 703 which compresses the video as described above and in FIGS. 3 and 4. The compress video task 703 stores the Huffman code trees used in the compressed output stream and stores the output stream on the hard disk 704.

On the decompression side, when a compressed video stream is sent to be decompressed, the capture compressed video task 705 captures the input stream. The input stream is passed from the capture compressed video task 705 to the decompress video task 706. The decompress video task 706 decompresses the input stream as described above and in FIG. 6 and outputs the decompressed video stream 707.

When the frame size of a video is large or the frame rate is high, the data rate of the video can be very large, and sometimes the CPU is not powerful enough to compress and decompress every frame. In such a case, the illustrated sequence does not compress frames for a predetermined period so the CPU can keep up with the video data that is coming in.

There are two approaches to selective compression. One approach is to compress at a regular frequency. For example, the illustrated sequence can compress every other frame, or it can compress two frames and not do anything about the third frame and then compress two more frames.

Adaptive Approach Based on Processing Availability

Figure 8:
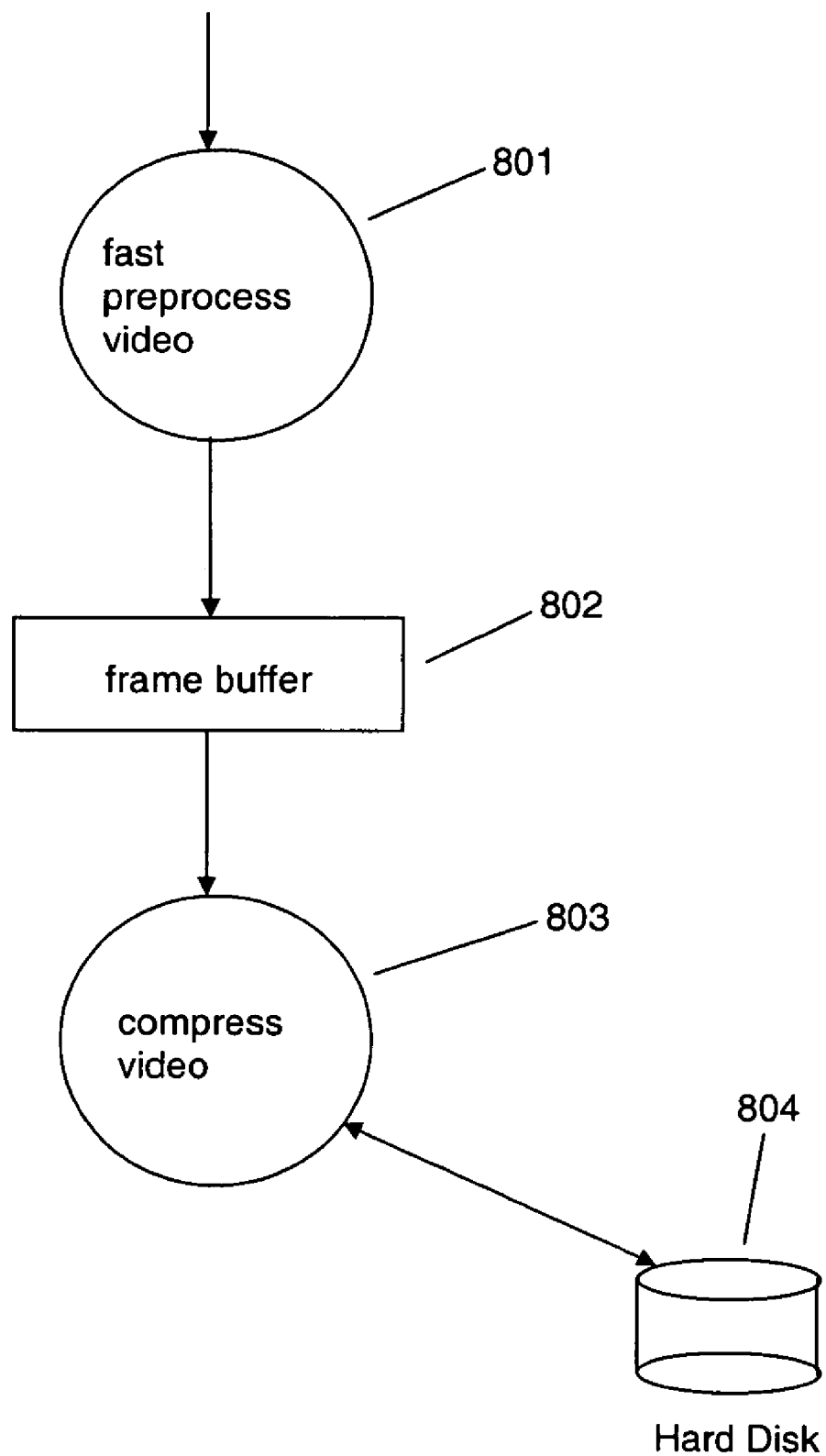
FIG. 8 is a block schematic diagram of a selective compression scheme.

With respect to FIG. 8, another approach is an adaptable system. This process compresses frames when there are enough CPU resources left. The sequence measures the CPU availability by maintaining a buffer of incoming frames 802. This buffer 802 is placed between the fast preprocess video task 801 and compress video task 803. If the number of frames in the buffer 802 becomes greater than a threshold, e.g., five, then the compress video task 803 skips compressing frames and immediately writes the frames in the buffer 802 to the disk 804. Once the buffer size becomes zero, or less than a second threshold value, then the compress video task 803 starts compressing frames again.

Other Embodiments

While the foregoing disclosure shows a number of illustrative embodiments, it will be apparent to those skilled in the art that various changes and modifications can be made herein without departing from the scope of the invention as defined by the appended claims. Furthermore, although elements of the invention may be described or claimed in the singular, the plural is contemplated unless limitation to the singular is explicitly stated. Additionally, ordinarily skilled artisans will recognize that operational sequences must be set forth in some specific order for the purpose of explanation and claiming, but the present invention contemplates various changes beyond such specific order.

In addition, those of ordinary skill in the relevant art will understand that information and signals may be represented using a variety of different technologies and techniques. For example, any data, instructions, commands, information, signals, bits, symbols, and chips referenced herein may be represented by voltages, currents, electromagnetic waves, magnetic fields or particles, optical fields or particles, other items, or a combination of the foregoing.

Moreover, ordinarily skilled artisans will appreciate that any illustrative logical blocks, modules, circuits, process steps, or other functionality described herein may be implemented as electronic hardware, firmware, computer software, or combinations thereof. Recognizing this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present invention.

The various illustrative logical blocks, modules, and circuits described in connection with the embodiments disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The steps of a method or algorithm described in connection with the embodiments disclosed herein may be embodied directly in hardware, in a software module executed by a processor, or in a combination of the two. A software module may reside in RAM memory, flash memory, ROM memory, EPROM memory, EEPROM memory, registers, hard disk, a removable disk, a CD-ROM, or any other form of storage medium known in the art. An exemplary storage medium is coupled to the processor such the processor can read information from, and write information to, the storage medium. In the alternative, the storage medium may be integral to the processor. The processor and the storage medium may reside in an ASIC.

Moreover, the previous description of the disclosed embodiments is provided to enable any person skilled in the art to make or use the present invention. Various modifications to these embodiments will be readily apparent to those skilled in the art, and the generic principles defined herein may be applied to other embodiments without departing from the spirit or scope of the invention. Thus, the present invention is not intended to be limited to the embodiments shown herein but is to be accorded the widest scope consistent with the principles and novel features disclosed herein.

The word "exemplary" is used herein to mean "serving as an example, instance, or illustration." Any embodiment described herein as "exemplary" is not necessarily to be construed as preferred or advantageous over other embodiments.

What is claimed is:

1. A method of compressing an encoded data stream having a plurality of data elements each element having a value, the method comprising the following operations performed for one or more subject video frames of the video stream:
    preprocessing element values of the subject video frame to yield corresponding error values of an error frame, each error value comprising a difference between the corresponding element value and a prediction of the element value based on values of surrounding element values by a predetermined predictive computation;
    computing a histogram of error values in the error frame;
    generating an entropy encoding map based upon the computed histogram;
    performing operations comprising:
        (a) applying the generated encoding map to compress a predetermined one of multiple subparts of the error frame in accordance with the computed histogram;
        (b) determining a compression ratio of the compressed subpart, and if said ratio fails to satisfy a predetermined threshold, regenerating the encoding map based upon a histogram of the predetermined subpart and applying the re-generated encoding map to re-compress the predetermined subpart; and
        for each remaining subpart of the error frame, repeating operations (a) and (b), where operation (a) utilizes one of the following: a most recently generated encoding map, an earlier generated encoding map;
    providing a compressed output comprising: each compressed subpart if the subgroup's compression ratio satisfied the predetermined threshold, otherwise the re-compressed subpart.

2. The method of claim 1, all of the encoding maps comprising one of the following: Huffman code trees, range encoding maps, arithmetic encoding maps.

3. The method of claim 1, wherein the predetermined subparts comprise one of the following: lines, rectangular areas, areas of other shapes.

4. At least one computer readable medium tangibly embodying a program of machine-readable instructions executable by a digital data processing machine to perform operations of compressing an encoded data stream having a plurality of data elements each element having a value, the method comprising the following operations performed for one or more subject video frames of the video stream:
    preprocessing element values of the subject video frame to yield corresponding error values of an error frame, each error value comprising a difference between the corresponding element value and a prediction of the element value based on values of surrounding element values by a predetermined predictive computation;
    computing a histogram of error values in the error frame;
    generating an entropy encoding map based upon the computed histogram;
    performing operations comprising:
        (a) applying the generated encoding map to compress a predetermined one of multiple subparts of the error frame in accordance with the computed histogram;
        (b) determining a compression ratio of the compressed subpart, and if said ratio fails to satisfy a predetermined threshold, regenerating the encoding map based upon a histogram of the predetermined subpart and applying the re-generated encoding map to re-compress the predetermined subpart;
        for each remaining subpart of the error frame, repeating operations (a) and (b), where operation (a) utilizes one of the following: a most recently generated encoding map, an earlier generated encoding map; and
    providing a compressed output comprising: each compressed subpart if the subgroup's compression ratio satisfied the predetermined threshold, otherwise the re-compressed subpart.

5. The medium of claim 4, all of the encoding maps comprising one of the following: Huffman code trees, range encoding maps, arithmetic encoding maps.

6. The medium of claim 4, wherein the predetermined subparts comprise one of the following: lines, rectangular areas, areas of other shapes.

7. Circuitry of multiple interconnected electrically conductive elements configured to perform operations of compressing an encoded data stream having a plurality of data elements each element having a value, the method comprising the following operations performed for one or more subject video frames of the video stream:
    preprocessing element values of the subject video frame to yield corresponding error values of an error frame, each error value comprising a difference between the corresponding element value and a prediction of the element value based on values of surrounding element values by a predetermined predictive computation;
    computing a histogram of error values in the error frame;
    generating an entropy encoding map based upon the computed histogram;
    performing operations comprising:
        (a) applying the generated encoding map to compress a predetermined one of multiple subparts of the error frame in accordance with the computed histogram;
        (b) determining a compression ratio of the compressed subpart, and if said ratio fails to satisfy a predetermined threshold, regenerating the encoding map based upon a histogram of the predetermined subpart and applying the re-generated encoding map to re-compress the predetermined subpart;

for each remaining subpart of the error frame, repeating operations (a) and (b), where operation (a) utilizes one of the following: a most recently generated encoding map, an earlier generated encoding map; and providing a compressed output comprising: each compressed subpart if the subgroup's compression ratio satisfied the predetermined threshold, otherwise the re-compressed subpart.

8. The circuitry of claim 7, all of the encoding maps comprising one of the following: Huffman code trees, range encoding maps, arithmetic encoding maps.

9. The circuitry of claim 7, wherein the predetermined subparts comprise one of the following: lines, rectangular areas, areas of other shapes.

* * * * *